(12) United States Patent
Martin et al.

(10) Patent No.: US 7,017,160 B2
(45) Date of Patent: Mar. 21, 2006

(54) CONCURRENT SHARED OBJECT IMPLEMENTED USING A LINKED-LIST WITH AMORTIZED NODE ALLOCATION

(75) Inventors: Paul A. Martin, Arlington, MA (US); David L. Detlefs, Westford, MA (US); Alexander T. Garthwaite, Beverly, MA (US); Guy L. Steele, Jr., Lexington, MA (US); Mark S. Moir, Somerville, MA (US)

(73) Assignee: Sun Microsystems, Inc., Sunnyvale, CA (US)

( * ) Notice: Subject to any disclaimer, the term of this patent is extended or adjusted under 35 U.S.C. 154(b) by 609 days.

(21) Appl. No.: 09/837,669

(22) Filed: Apr. 18, 2001

(65) Prior Publication Data

US 2001/0047361 A1 Nov. 29, 2001

Related U.S. Application Data

(63) Continuation-in-part of application No. 09/551,113, filed on Apr. 18, 2000, now abandoned.

(51) Int. Cl.
*G06F 09/44* (2006.01)
*G06F 09/54* (2006.01)

(52) U.S. Cl. .................. 719/315; 719/312; 719/314
(58) Field of Classification Search .................. 719/315, 719/312, 314, 313, 316; 709/310, 312, 313, 709/314
See application file for complete search history.

(56) References Cited

U.S. PATENT DOCUMENTS

| | | | |
|---|---|---|---|
| 3,686,641 A | * | 8/1972 | Logan et al. ............... 709/314 |
| 3,886,525 A | | 5/1975 | Brown et al. |
| 5,797,005 A | * | 8/1998 | Bahls et al. ................ 709/314 |
| 6,223,335 B1 | | 4/2001 | Cartwright, Jr. et al. ........ 717/1 |
| 6,247,064 B1 | * | 6/2001 | Alferness et al. ........... 709/312 |
| 6,360,219 B1 | * | 3/2002 | Bretl et al. ..................... 707/8 |
| 6,374,339 B1 | * | 4/2002 | Iivonen ....................... 711/170 |

FOREIGN PATENT DOCUMENTS

| | | |
|---|---|---|
| EP | 0 366 585 A | 5/1990 |
| EP | 0 466 339 A2 | 1/1992 |
| WO | WO 86 00434 A | 1/1986 |

OTHER PUBLICATIONS

Josuttis, Nicolai. "C++ Standard Library: A Tutorial and Reference." Addison Wesley. Aug. 6, 1999.*
Chuang et al. "Real–Time Deques, Multihead Turing Machines, and Purely Functional Programming." ACM. Jun. 1993.*
Blumofe, Robert D. et al., "*Verification of a Concurrent Deque Implementation*", University of Texas at Austin, Department of Computer Sciences, Technical Report TR99–11, Jun. 1999.

(Continued)

*Primary Examiner*—Lewis A. Bullock, Jr.
(74) *Attorney, Agent, or Firm*—Zagorin O'Brien Graham LLP

(57) ABSTRACT

The Hat Trick deque requires only a single DCAS for most pushes and pops. The left and right ends do not interfere with each other until there is one or fewer items in the queue, and then a DCAS adjudicates between competing pops. By choosing a granularity greater than a single node, the user can amortize the costs of adding additional storage over multiple push (and pop) operations that employ the added storage. A suitable removal strategy can provide similar amortization advantages. The technique of leaving spare nodes linked in the structure allows an indefinite number of pushes and pops at a given deque end to proceed without the need to invoke memory allocation or reclamation so long as the difference between the number of pushes and the number of pops remains within given bounds. Both garbage collection dependent and explicit reclamation implementations are described.

64 Claims, 14 Drawing Sheets

OTHER PUBLICATIONS

Farook, Mohammad et al., "*Managing Long Linked Lists Using Lock Free Techniques*", University of Manitoba, Canada, 1998.

Michael, Maged M. et al., "*Simple, Fast, and Practical Non–Blocking and Blocking Concurrent Queue Algorithms*", University of Rochester, Department of Computer Science, 1996.

Prakash, Sundeep et al., "*Non–Blocking Algorithms for Concurrent Data Structures*", University of Florida, Jul. 1, 1991.

Prakash, Sundeep et al., "*A Nonblocking Algorithm for Shared Queues Using Compare–and–Swap*", IEEE Transactions on Computers, vol. 43, No. 5, May 1994.

Shann, Chien–Hua et al., "*A Practical Nonblocking Queue Algorithm Using Compare–and Swap*", IEEE, Jul. 2000.

Turek, John et al., "*Locking Without Blocking: Making Lock Based Concurrent Data Structure Algorithms Nonblocking*", ACM, 1992.

Valois, John D., "*Lock–Free Linked Lists Using Compare–and–Swap*", ACM, 1995.

IBM Technical Disclosure Bulletin, "*Conditional Multiple Store Instruction*", Feb. 1, 1980.

David L. Detlefs et al., "Even Better DCAS–Based Concurrent Deques," 14th International Conference, Disc 2000. Proceedings (Lecture Notes in Computer Science, vol. 1914), Distributed Computing, Toledo, Spain, Oct. 4–6, 2000, Online, p. 29–73, XP002172096, 2000, Springer–Verlag, Berlin, Germany, ISBN: 3–540–41143–7, [Retrieved from the Internet on Jul. 13, 2001: URL:http://research.sun.com/jtech/subs/00–deque2.ps].

U.S. Appl. No. 09/547,290, entitled Maintaining a Double–Ended Queue as a Linked–List with Sentinel Nodes and Delete Flags with Concurrent Non–Blocking Insert and Remove Operations Using a Double Compare–And–Swap Primitive, filed Apr. 11, 2000, by inventor(s) Nir N. Shavit, Paul A. Martin, and Guy L. Steele Jr.

U.S. Appl. No. 09/551,311, entitled Shared Object Implemented Using a Linked–List Technique that Tolerates Certain Concurrent Opposing–End Removals Using a Distinguishing Pointer Value, filed Apr. 18, 2000, by inventor(s) Guy L. Steele Jr., Alexander T. Garthwaite, Paul A. Martin, and Nir N. Shavit.

U.S. Appl. No. 09/547,288, entitled Maintaining a Double–Ended Queue in a Contiguous Array with Concurrent Non–Blocking Insert and Remove Operations Using a Double Compare–And–Swap Primitive, filed Apr. 11, 2000, by inventor(s) Nir N. Shavit, Ole Agesen, David L. Detlefs, Christine H. Flood, Alexander T. Garthwaite, Paul A. Martin, and Guy L. Steele Jr.

Y. Afek, M. Merritt, G. Taubenfield, and D. Touitou. "Disentangling Multi–Object Operations," *Proceedings of the 16th Annual ACM Symposium on Principles of Distributed Computing*, pp. 111–120, Aug. 1997. Santa Barbara, CA.

N. S. Arora, Blumofe, and C. G. Plaxton. "Thread Scheduling For Multiprogrammed Multiprocessors," *Proceedings of the 10th Annual ACM Symposium on Parallel Algorithms and Architectures*, 1998.

H. Attiya and E. Dagan. "Universal Operations: Unary versus Binary," *Proceedings of the 15th Annual ACM Symposium on Principles of Distributed Computing*, 11 pages, May 23–26, 1996. Phila. PA.

Hagit Attiya, Nancy Lynch, and Nir Shavit. "Are Wait–Free Algorithms Fast?" *Journal of the ACM*, 41(4):725–763, pp. 223–232, Jul. 1994.

G. Barnes. "A Method For Implementing Lock–Free Shared Data Structures," *Proceedings of the 5th Annual ACM Symposium on Parallel Algorithms and Architectures*, pp. 261–270, Jun. 1993.

B. N. Bershad. "Practical Considerations For Non–Blocking Concurrent Objects," *Proceedings 13th IEEE International Conference on Distributed Computing Systems*, pp. 264–273. IEEE Computer Society Press, May 25–28, 1993. Los Alamitos CA.

M. Greenwald. "Non–Blocking Synchronization and System Design," PhD thesis, Stanford University Technical Report STAN–CS–TR–99–1624, 241 pages, Palo Alto, CA, 8 1999.

M. B. Greenwald and D. R. Cheriton. "The Synergy Between Non–Blocking Synchronization And Operating System Structure," *2nd Symposium on Operating Systems Design and Implementation*, pp. 123–136, Oct. 28–31, 1996. Seattle, WA.

M. Herlihy. "A Methodology For Implementing Highly Concurrent Data Objects," *ACM Transactions on Programming Languages and Systems*, 15(5):745–770, Nov. 1993.

M. Herlihy and J. Moss. "Transactional memory: Architectural Support For Lock–Free Data Structures," *Technical Report CRL 92/07*, Digital Equipment Corporation, 12 pages, Cambridge Research Lab, 1992.

M.P. Herlighy. "Wait–Free Synchronization," *ACM Transactions On Programming Languages and Systems*, 13(1):124–149, Jan. 1991.

M.P. Herlihy and J.M. Wing. "Linearizability: A Correctness Condition For Con–Current Objects," *ACM Transactions On Programming Languages and Systems*, 12(3):463–492, Jul. 1990.

H. Massalin and C. Pu. "A Lock–Free Multiprocessor OS Kernel," *Technical Report TR CUCS–005–9*, pp. 1–19, Columbia University New York, NY, 1991.

H. Massalin, "Synthesis: An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 1992; pp. 1–149, XP002172093 [retrieved from the Internet on Jul. 13, 2001: URL: ftp://ftp.cs.columbia.edu/reports/reports–1992/cucs–039–92.ps.gz].

Martin C. Rinard, "Effective Fine–Grain Synchronization for Automatically Parallelized Programs Using Optimistic Synchronization Primitives," *ACM Trans. Computer Systems*, 17(4):337–371, Nov. 1999.

N. Shavit and D. Touitou. "Software Transactional Memory," *Distributed Computing*, 10(2):99–116, Feb. 1997.

Hagit Attiya and Ophir Rachman, "Atomic Snapshots in $O(n \log n)$ Operations," Society for Industrial and Applied Mathematics, SIAM Journal on Computing, Apr. 1998, vol. 27, No. 2, pp. 319–340.

Weiss, Mark Allen, *Data Structures & Algorithm Analysis in C++*, Second Edition, Reading, Mass., Addison–Wesley, 1999, Chapter 3.

Comer, Douglas, *Operating System Design: The Xinu Approach,* Englewood Cliffs, New Jersey, Prentice–Hall, Inc., 1984, Chapter 3.

Patterson, David A. and Hennessy, John L., Computer Architecture; A Quantitative Approach, Second Edition, San Francisco, California, Morgan Kaufman Publishers, Inc., 1996, pp. 485–495 and 562–572.

Cohoon, James P. and Davidson, Jack W., *C++ Program Design: An Introduction to Programming and Object–Oriented Design,* Second Edition, New York, New York, WCB/McGraw–Hill, 1999, pp. 465–502.

Stroustrup, Bjarne, The C++ Programming Language, Third Edition, Reading, Mass., Addison–Wesley, 1997, pp. 461–497.

Agesen, Ole, et al.: "DCAS–Based Concurrent Deques," SPAA 2000. 12th Annual ACM Symposium on Parallel Algorithms and Architectures, Bar Harbor, ME, Jul. 9–12, 2000, Annual ACM Symposium on Parallel Algorithms and Architectures, New York, NY: ACM, US, Jul. 9, 2000, XP002172095, ISBN: 1–58113–185–2, pp. 137–146.

* cited by examiner

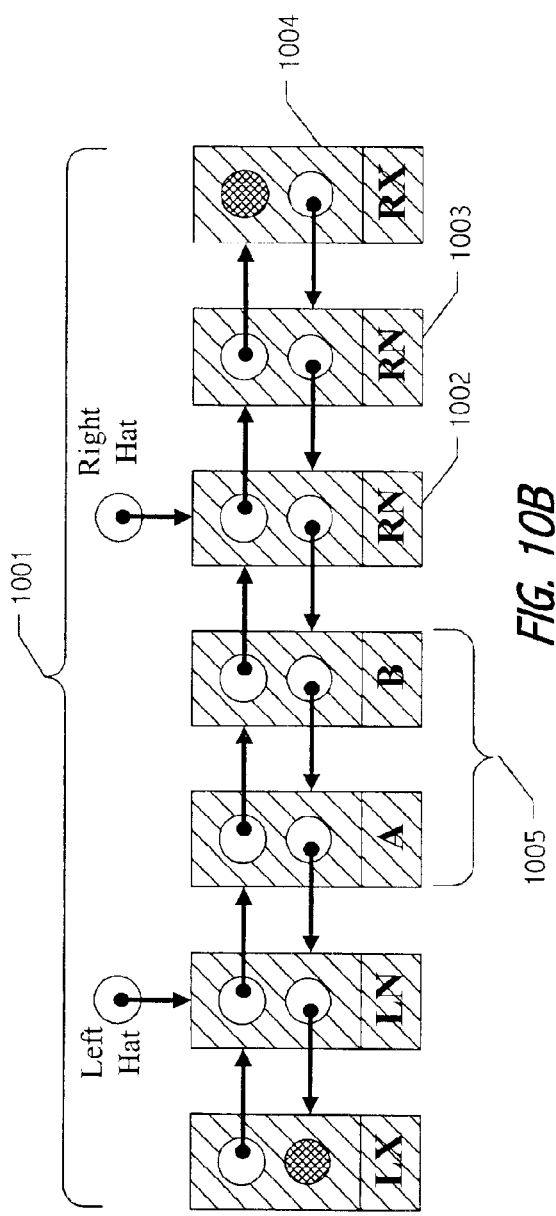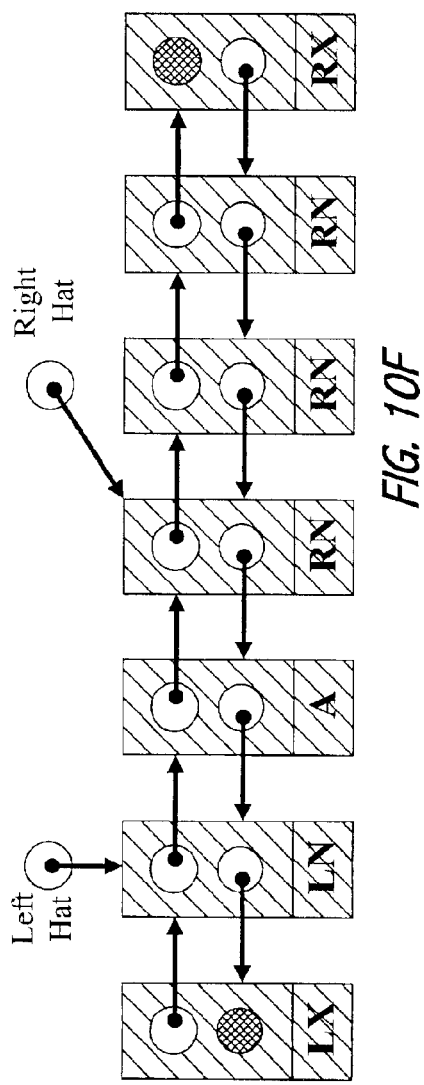

CONCURRENT SHARED OBJECT IMPLEMENTED USING A LINKED-LIST WITH AMORTIZED NODE ALLOCATION

CROSS-REFERENCE TO RELATED APPLICATION(S)

This application is a continuation-in-part of U.S. application Ser. No. 09/551,113, filed Apr. 18, 2000, now abandoned.

In addition, this application is related to U.S. patent application Ser. No. 09/837,671, now abandoned, entitled "LOCK FREE REFERENCE COUNTING," naming David L. Detlefs, Paul A. Martin, Mark S. Moir, and Guy L. Steele Jr. as inventors, and filed on even date herewith.

BACKGROUND OF THE INVENTION

1. Field of the Invention

The present invention relates generally to coordination amongst execution sequences in a multiprocessor computer, and more particularly, to structures and techniques for facilitating non-blocking access to concurrent shared objects.

2. Description of the Related Art

An important abstract data structure in computer science is the "double-ended queue" (abbreviated "deque" and pronounced "deck"), which is a linear sequence of items, usually initially empty, that supports the four operations of inserting an item at the left-hand end ("left push"), removing an item from the left-hand end ("left pop"), inserting an item at the right-hand end ("right push"), and removing an item from the right-hand end ("right pop").

Sometimes an implementation of such a data structure is shared among multiple concurrent processes, thereby allowing communication among the processes. It is desirable that the data structure implementation behave in a linearizable fashion; that is, as if the operations that are requested by various processes are performed atomically in some sequential order.

One way to achieve this property is with a mutual exclusion lock (sometimes called a semaphore). For example, when any process issues a request to perform one of the four deque operations, the first action is to acquire the lock, which has the property that only one process may own at a time. Once the lock is acquired, the operation is performed on the sequential list; only after the operation has been completed is the lock-released. This clearly enforces the property of linearizability.

However, it is generally desirable for operations on the left-hand end of the deque to interfere as little as possible with operations on the right-hand end of the deque. Using a mutual exclusion lock as described above, it is impossible for a request for an operation on the right-hand end of the deque to make any progress while the deque is locked for the purposes of performing an operation on the left-hand end. Ideally, operations on one end of the deque would never impede operations on the other end of the deque unless the deque were nearly empty (containing two items or fewer) or, in some implementations, nearly full.

In some computational systems, processes may proceed at very different rates of execution; in particular, some processes may be suspended indefinitely. In such circumstances, it is highly desirable for the implementation of a deque to be "non-blocking" (also called "lock-free"); that is, if a set of processes are using a deque and an arbitrary subset of those processes are suspended indefinitely, it is always still possible for at least one of the remaining processes to make progress in performing operations on the deque.

Certain computer systems provide primitive instructions or operations that perform compound operations on memory in a linearizable form (as if atomically). The VAX computer, for example, provided instructions to directly support the four deque operations. Most computers or processor architectures provide simpler operations, such as "test-and-set"; (IBM 360), "fetch-and-add" (NYU Ultracomputer), or "compare-and-swap" (SPARC). SPARC® architecture based processes are available from Sun Microsystems, Inc., Mountain View, Calif. SPARC trademarks are used under license and are trademarks or registered trademarks of SPARC International, Inc. in the United States and other countries. Products bearing SPARC trademarks are based upon an architecture developed by Sun Microsystems.

The "compare-and-swap" operation (CAS) typically accepts three values or quantities: a memory address A, a comparison value C, and a new value N. The operation fetches and examines the contents V of memory at address A. If those contents V are equal to C, then N is stored into the memory location at address A, replacing V. Whether or not V matches C, V is returned or saved in a register for later inspection. AU this is implemented in a linearizable, if not atomic, fashion. Such an operation may be notated as "CAS(A, C, N)".

Non-blocking algorithms can deliver significant performance benefits to parallel systems. However, there is a growing realization that existing synchronization operations on single memory locations, such as compare-and-swap (CAS), are not expressive enough to support design of efficient non-blocking algorithms. As a result, stronger synchronization operations are often desired. One candidate among such operations is a double-word ("extended") compare-and-swap (implemented as a CASX instruction in some versions of the SPARC architecture), which is simply a CAS that uses operands of two words in length. It thus operates on two memory addresses, but they are constrained to be adjacent to one another. A more powerful and convenient operation is "double compare-and-swap" (DCAS), which accepts six values: memory addresses A1 and A2, comparison values C1 and C2, and new values N1 and N2. The operation fetches and examines the contents V1 of memory at address A1 and the contents V2 of memory at address A2. If V1 equals C1 and V2 equals C2, then N1 is stored into the memory location at address A1, replacing V1, and N2 is stored into the memory location at address A2, replacing V2.

Whether or not V1 matches C1 and whether or not V2 matches C2, V1 and V2 are returned or saved in a registers for later inspection. All this is implemented in a linearizable, if not atomic, fashion. Such an operation may be notated as "DCAS(A1, A2, C1, C2, N1, N2)".

Massalin and Pu disclose a collection of DCAS-based concurrent algorithms. See e.g., H. Massalin and C. Pu, *A Lock-Free Multiprocessor OS Kernel*, Technical Report TR CUCS-005-9, Columbia University, New York, N.Y., 1991, pages 1–19. In particular, Massalin and Pu disclose a lock-free operating system kernel based on the DCAS operation offered by the Motorola 68040 processor, implementing structures such as stacks, FIFO-queues, and linked lists. Unfortunately, the disclosed algorithms are centralized in nature. In particular, the DCAS is used to control a memory location common to all operations and therefore limits overall concurrency.

Greenwald discloses a collection of DCAS-based concurrent data structures that improve on those of Massalin and Pu. See e.g., M. Greenwald. *Non-Blocking Synchronization and System Design*, Ph.D. thesis, Stanford University Technical Report STAN-CS-TR-99-1624, Palo Alto, Calif., August 1999, 241 pages. In particular, Greenwald discloses implementations of the DCAS operation in software and hardware and discloses two DCAS-based concurrent double-ended queue (deque) algorithms implemented using an array. Unfortunately, Greenwald's algorithms use DCAS in a restrictive way. The first, described in Greenwald, *Non-Blocking Synchronization and System Design*, at pages 196–197, uses a two-word DCAS as if it were a three-word operation, storing two deque end pointers in the same memory word, and performing the DCAS operation on the two-pointer word and a second word containing a value. Apart from the fact that Greenwald's algorithm limits applicability by cutting the index range to half a memory word, it also prevents concurrent access to the two ends of the deque. Greenwald's second algorithm, described in Greenwald, *Non-Blocking Synchronization and System Design*, at pages 217–220, assumes an array of unbounded size, and does not deal with classical array-based issues such as detection of when the deque is empty or full.

Arora et al. disclose a CAS-based deque with applications in job-stealing algorithms. See e.g., N. S. Arora, Blumofe, and C. G. Plaxton, *Thread Scheduling For Multiprogrammed Multiprocessors*, in *Proceedings of the 10th Annual ACM Symposium on Parallel Algorithms and Architectures*, 1998. Unfortunately, the disclosed non-blocking implementation restricts one end of the deque to access by only a single processor and restricts the other end to only pop operations.

Accordingly, improved techniques are desired that provide linearizable and non-blocking (or lock-free) behavior for implementations of concurrent shared objects such as a deque, and which do not suffer from the above-described drawbacks of prior approaches.

SUMMARY OF THE INVENTION

A set of structures and techniques are described herein whereby an exemplary concurrent shared object, namely a double-ended queue (deque), is implemented. Although non-blocking, linearizable deque implementations exemplify several advantages of realizations in accordance with the present invention, the present invention is not limited thereto. Indeed, based on the description herein and the claims that follow, persons of ordinary skill in the art will appreciate a variety of concurrent shared object implementations. For example, although the described deque implementations exemplify support for concurrent push and pop operations at both ends thereof, other concurrent shared objects implementations in which concurrency requirements are less severe, such as LIFO or stack structures and FIFO or queue structures, may also be implemented using the techniques described herein. Accordingly, subsets of the functional sequences and techniques described herein for exemplary deque realizations may be employed to support any of these simpler structures.

Furthermore, although various non-blocking, linearizable deque implementations described herein employ a particular synchronization primitive, namely a double compare and swap (DCAS) operation, the present invention is not limited to DCAS-based realizations. Indeed, a variety of synchronization primitives may be employed that allow linearizable, if not atomic, update of at least a pair of storage locations. In general, N-way Compare and Swap (NCAS) operations (N≧2) may be employed.

Choice of an appropriate synchronization primitive is typically affected by the set of alternatives available in a given computational system. While direct hardware- or architectural-support for a particular primitive is preferred, software emulations that build upon an available set of primitives may also be suitable for a given implementation. Accordingly, any synchronization primitive that allows the access and spare node maintenance operations described herein to be implemented with substantially equivalent semantics to those described herein is suitable.

Accordingly, a novel linked-list-based concurrent shared object implementation has been developed that provides non-blocking and linearizable access to the concurrent shared object. In an application of the underlying techniques to a deque, non-blocking completion of access operations is achieved without restricting concurrency in accessing the deque's two ends. While providing the a non-blocking and linearizable implementation, embodiments in accordance with the present invention combine some of the most attractive features of array-based and linked-list-based structures. For example, like an array-based implementation, addition of a new element to the deque can often be supported without allocation of additional storage. However, when spare nodes are exhausted, embodiments in accordance with the present invention allow expansion of the linked-list to include additional nodes. The cost of splicing a new node into the linked-list structure may be amortized over the set of subsequent push and pop operations that use that node to store deque elements. Some realizations also provide for removal of excess spare nodes. In addition, an explicit reclamation implementation is described, which facilitates use of the underlying techniques in environments or applications where automatic reclamation of storage is unavailable or impractical.

BRIEF DESCRIPTION OF THE DRAWINGS

The present invention may be better understood, and its numerous objects, features, and advantages made apparent to those skilled in the art by referencing the accompanying drawings.

FIG. 3A depicts the state before a synchronization operation of a push_right operation; while FIG. 3B depicts the state after success of the synchronization operation.

FIG. 5A depicts the state before a synchronization operation of a pop_right operation; while FIG. 5B depicts the state after success of the synchronization operation.

FIGS. 10A, 10B, 10C, 10D, 10E and 10F illustrate various exemplary states of a linked-list structure encoding a deque in accordance with some embodiments of the present invention.

The use of the same reference symbols in different drawings indicates similar or identical items.

DESCRIPTION OF THE PREFERRED EMBODIMENT(S)

Figure 1:
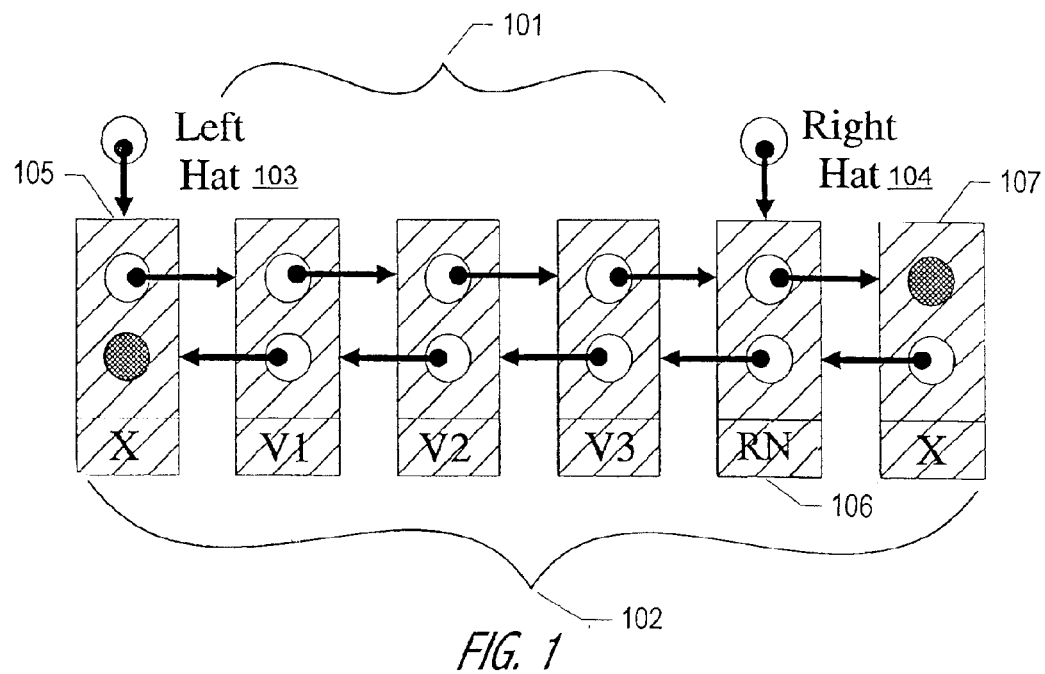
FIG. 1 depicts an illustrative state of a linked-list structure encoding a double-ended queue (deque) in accordance with an exemplary embodiment of the present invention.

The description that follows presents a set of techniques, objects, functional sequences and data structures associated with concurrent shared object implementations employing linearizable synchronization operations in accordance with an exemplary embodiment of the present invention. An exemplary non-blocking, linearizable concurrent double-ended queue (deque) implementation that employs double compare-and-swap (DCAS) operations is illustrative. A deque is a good exemplary concurrent shared object implementation in that it involves all the intricacies of LIFO-stacks and FIFO-queues, with the added complexity of handling operations originating at both of the deque's ends. Accordingly, techniques, objects, functional sequences and data structures presented in the context of a concurrent deque implementation will be understood by persons of ordinary skill in the art to describe a superset of support and functionality suitable for less challenging concurrent shared object implementations, such as LIFO-stacks, FIFO-queues or concurrent shared objects (including deques) with simplified access semantics.

In view of the above, and without limitation, the description that follows focuses on an exemplary linearizable, non-blocking concurrent deque implementation that behaves as if access operations on the deque are executed in a mutually exclusive manner, despite the absence of a mutual exclusion mechanism. Advantageously, and unlike prior approaches, deque implementations in accordance with some embodiments of the present invention are dynamically-sized and allow concurrent operations on the two ends of the deque to proceed independently. Since synchronization operations are relatively slow and/or impose overhead, it is generally desirable to minimize their use. Accordingly, one advantage of some implementations in accordance with the present invention is that in typical execution paths of both access and spare node maintenance operations, only a single synchronization operation is required.

Computational Model

One realization of the present invention is as a deque implementation employing the DCAS operation on a shared memory multiprocessor computer. This realization, as well as others, will be understood in the context of the following computation model, which specifies the concurrent semantics of the deque data structure.

In general, a concurrent system consists of a collection of n processors. Processors communicate through shared data structures called objects. Each object has an associated set of primitive operations that provide the mechanism for manipulating that object. Each processor P can be viewed in an abstract sense as a sequential thread of control that applies a sequence of operations to objects by issuing an invocation and receiving the associated response. A history is a sequence of invocations and responses of some system execution. Each history induces a "real-time" order of operations where an operation A precedes another operation B, if A's response occurs before B's invocation. Two operations are concurrent if they are unrelated by the real-time order. A sequential history is a history in which each invocation is followed immediately by its corresponding response. The sequential specification of an object is the set of legal sequential histories associated with it. The basic correctness requirement for a concurrent implementation is linearizability, which requires that every concurrent history is "equivalent" to some legal sequential history which is consistent with the real-time order induced by the concurrent history. In a linearizable implementation, an operation appears to take effect atomically at some point between its invocation and response. In the model described herein, the collection of shared memory locations of a multiprocessor computer's memory (including location L) is a linearizable implementation of an object that provides each processor $P_i$ with the following set of sequentially specified machine operations:

$Read_i$ (L) reads location L and returns its value.

$Write_i$ (L, v) writes the value v to location L.

$DCAS_i$ (L1, L2, o1, o2, n1, n2) is a double compare-and-swap operation with the semantics described below.

Implementations described herein are non-blocking (also called lock-free). Let us use the term higher-level operations in referring to operations of the data type being implemented, and lower-level operations in referring to the (machine) operations in terms of which it is implemented. A non-blocking implementation is one in which, even though individual higher-level operations may be delayed, the system as a whole continuously makes progress. More formally, a non-blocking implementation is one in which any infinite history containing a higher-level operation that has an invocation but no response must also contain infinitely many responses. In other words, if some processor performing a higher-level operation continuously takes steps and does not complete, it must be because some operations invoked by other processors are continuously completing their responses. This definition guarantees that the system as a whole makes progress and that individual processors cannot be blocked, only delayed by other processors continuously taking steps. Using locks would violate the above condition, hence the alternate name: lock-free.

Double Compare-and-Swap Operation

Double compare-and-swap (DCAS) operations are well known in the art and have been implemented in hardware, such as in the Motorola 68040 processor, as well as through software emulation. Accordingly, a variety of suitable implementations exist and the descriptive code that follows is meant to facilitate later description of concurrent shared object implementations in accordance with the present invention and not to limit the set of suitable DCAS implementations. For example, order of operations is merely illustrative and any implementation with substantially equivalent semantics is also suitable. Similarly, some formulations (such as described above) may return previous values while others may return success/failure indications. The illustrative formulation that follows is of the latter type. In general, any of a variety of formulations are suitable.

```
boolean DCAS (val *addr1, val *addr2,
              val old1, val old2,
              val new1, val new2) {
    atomically {
        if ( (*addr1==old1) && (*addr2==old2) ) {
            *addr1 = new1;
            *addr2 = new2;
            return true;
        } else {
            return false;
        }
    }
}
```

The above sequences of operations implementing the DCAS operation are executed atomically using support suitable to the particular realization. For example, in various realizations, through hardware support (e.g., as implemented by the Motorola 68040 microprocessor or as described in M. Herlihy and J. Moss, *Transactional memory: Architectural Support For Lock-Free Data Structures*, Technical Report CRL July 1992, Digital Equipment Corporation, Cambridge Research Lab, 1992, 12 pages), through non-blocking software emulation (such as described in G. Barnes, *A Method For Implementing Lock-Free Shared Data Structures*, in *Proceedings of the 5th ACM Symposium on Parallel Algorithms and Architectures*, pages 261–270, June 1993 or in N. Shavit and D. Touitou, *Software transactional memory*, Distributed Computing, 10(2):99–116, February 1997), or via a blocking software emulation (such as described in U.S. patent application Ser. No. 09/207,940, now pending entitled "PLATFORM INDEPENDENT DOUBLE COMPARE AND SWAP OPERATION," naming Cartwright and Agesen as inventors, and filed Dec. 9, 1998).

Although the above-referenced implementations arc presently preferred, other DCAS implementations that substantially preserve the semantics of the descriptive code (above) are also suitable. Furthermore, although much of the description herein is focused on double compare-and-swap (DCAS) operations, it will be understood that N-location compare-and-swap operations ($N \geq 2$) or transactional memory may be more generally employed, though often at some increased overhead.

A Double-ended Queue (Deque)

A deque object S is a concurrent shared object, that in an exemplary realization is created by an operation of a constructor operation, e.g., make_deque ( ), and which allows each processor $P_i$, $0 \leq i \leq n-1$, of a concurrent system to perform the following types of operations on S: push_right$_i$ (v), push_left$_i$ (v), pop_right$_i$ ( ), and pop_left$_i$ ( ). Each push operation has an input, v, where v is selected from a range of values. Each pop operation returns an output from the range of values. Push operations on a fill deque object and pop operations on an empty deque object return appropriate indications. In the case of a dynamically-sized deque, "full" refers to the case where the deque is observed to have no available nodes to accommodate a push and the system storage allocator reports that no more storage is available to the process.

A concurrent implementation of a deque object is one that is linearizable to a standard sequential deque. This sequential deque can be specified using a state-machine representation that captures all of its allowable sequential histories. These sequential histories include all sequences of push and pop operations induced by the state machine representation, but do not include the actual states of the machine. In the following description, we abuse notation slightly for the sake of clarity.

The state of a deque is a sequence of items $S = <v_0, \ldots, v_k>$ from the range of values, having cardinality $0 \leq |S| \leq \text{max\_length\_S}$. The deque is initially in the empty state (following invocation of make_deque ( )), that is, has cardinality 0, and is said to have reached a fill state if its cardinality is max_length_S. In general, for deque implementations described herein, cardinality is unbounded except by limitations (if any) of an underlying storage allocator.

The four possible push and pop operations, executed sequentially, induce the following state transitions of the sequence $S = <v_0, \ldots, v_k>$, with appropriate returned values:

| | |
|---|---|
| push_right ($v_{new}$) | if S is not full, sets S to be the sequence $S = <v_0, \ldots, v_k, v_{new}>$ |
| push_left ($v_{new}$) | if S is not full, sets S to be the sequence $S = <v_{new}, v_0, \ldots, v_k>$ |
| pop_right ( ) | if S is not empty, sets S to be the sequence $S = <v_0, \ldots, v_{k-1}>$ and returns the item, $v_k$. |
| pop_left ( ) | if S is not empty, sets S to be the sequence $S = <v_1, \ldots, v_k>$ and returns the item $v_0$. |

For example, starting with an empty deque state, S=< >, the following sequence of operations and corresponding transitions can occur. A push_right (1) changes the deque state to S=<1>. A push_left (2) subsequently changes the deque state to S=<2,1>. A subsequent push_right (3) changes the deque state to S=<2,1,3>. Finally, a subsequent pop_right (changes the deque state to S=<2,1> and returns the value, 3. In some implementations, return values may be employed to indicate success or failure. Persons of ordinary skill in the art will appreciate a variety of suitable formulations.

Storage Reclamation

Many programming languages and execution environments have traditionally placed responsibility for dynamic allocation and deallocation of memory on the programmer. For example, in the C programming language, memory is allocated from the heap by the malloc procedure (or its variants). Given a pointer variable, p, execution of machine instructions corresponding to the statement p=malloc (sizeof (SomeStruct)) causes pointer variable p to point to newly allocated storage for a memory object of size necessary for representing a SomeStruct data structure. After use, the memory object identified by pointer variable p can be deallocated, or freed, by calling free (p). Other languages provide analogous facilities for explicit allocation and deallocation of memory.

Dynamically-allocated storage becomes unreachable when no chain of references (or pointers) can be traced from a "root set" of references (or pointers) to the storage. Memory objects that are no longer reachable, but have not been freed, are called garbage. Similarly, storage associated with a memory object can be deallocated while still referenced. In this case, a dangling reference has been created. In general, dynamic memory can be hard to manage correctly. Because of this difficulty, garbage collection, i.e., automatic reclamation of dynamically-allocated storage, can be an attractive model of memory management. Garbage collection is particularly attractive for languages such as the JAVA™ language (JAVA and all Java-based marks and logos are trademarks or registered trademarks of Sun Microsystems, Inc. in the United States and other countries), Prolog, Lisp, Smalltalk, Scheme, Eiffel, Dylan, M L, Haskell, Miranda, Oberon, etc. See generally, Jones & Lins, *Garbage Collection: Algorithms for Automatic Dynamic Memory Management*, pp. 1–41, Wiley (1996) for a discussion of garbage collection and of various algorithms and implementations for performing garbage collection.

In general, the availability of particular memory management facilities are language, implementation and execution environment dependent. Accordingly, for some realizations in accordance with the present invention, it is acceptable to assume that storage is managed by a "garbage collector" that returns (to a "free pool") that storage for which it can be proven that no process will, in the future, access data structures contained therein. Such a storage management scheme allows operations on a concurrent shared object, such as a deque, to simply eliminate references or pointers to a removed data structure and rely upon operation of the garbage collector for automatic reclamation of the associated storage.

However, for some realizations, a garbage collection facility may be unavailable or impractical. For example, one realization in which automatic reclamation may be unavailable or impractical is a concurrent shared object implementation (e.g., a deque) employed in the implementation of a garbage collector itself. Accordingly, in some realizations in accordance with the present invention, storage is explicitly reclaimed or "freed" when no longer used. For example, in some realizations, removal operations include explicit reclamation of the removed storage.

Deque with Amortized Node Allocation

One embodiment in accordance with the present invention includes a linked-list-based implementation of a lock-free double-ended queue (deque). The implementation includes both structures (e.g., embodied as data structures in memory and/or other storage) and techniques (e.g., embodied as operations, functional sequences, instructions, etc.) that allow costs associated with allocation of additional storage to be amortized over multiple access operations. The exemplary implementation employs double compare and swap (DCAS) operations to provide linearizable behavior. However, as described elsewhere herein, other synchronization primitives may be employed in other realizations. In general, the exemplary implementation exhibits a number of features that tend to improve its performance:

a) Access operations (e.g., push and pop operations) at opposing left and right ends of the deque do not interfere with each other except when the deque is either empty or contains only a single node.

b) A single DCAS call is sufficient for an uncontended pop operation, and if a suitable spare node exists, for an uncontended push operation.

c) A full storage width DCAS primitive that operates on two independently-addressable storage units may be employed. Accordingly, full storage width is available for addresses or data and tag bits need not be set aside.

d) Storage for use in pushes is allocated in clumps and spliced onto the linked-list structure with a single DCAS. Storage corresponding to items that are popped from the deque remains in the linked-list structure until explicitly removed. Unless removed, such storage is available for use by subsequent pushes onto (and pops from) a respective end of the deque.

Although all of these features are provided in some realizations, fewer than all may be provided in others.

The organization and structure of a doubly-linked list 102 and deque 101 encoded therein are now described with reference to FIG. 1. In general, individual elements of the linked-list can be represented as instances of a simple node structure. For example, in one realization, nodes are implemented in accordance with the following definition:

```
typedef node {
    node *R;
    node *L;
    val value;
}
```

Each node encodes two pointers and a value field. The first pointer of a node points to the node to its right in a linked-list of such nodes, and the second pointer points to the node to its left. There are two shared variables LeftHat and RightHat, which always point to nodes within the doubly-linked list. LeftHat always points to a node that is to the left (though not necessarily immediately left) of the node to which RightHat points. The node to which LeftHat points at a given instant of time is sometimes called the left sentinel and the node to which RightHat points at a given instant of time is sometimes called the right sentinel. The primary invariant of this scheme is that the nodes, including both sentinels, always form a consistent doubly-linked list. Each node has a left pointer to its left neighbor and a right pointer to its right neighbor. The doubly-linked chain is terminated at its end nodes by a null in the right pointer of the rightmost node and a null in the left pointer of the leftmost node.

It is assumed that there are three distinguishing null values (called "nullL", "nullR", and "nullX") that can be stored in the value field of a node but which are never requested to be pushed onto the deque. The left sentinel is always to the left of the right sentinel, and the zero or more nodes falling between the two sentinels always have non-null values in their value fields. Both sentinels and all nodes "beyond" the sentinels in the linked structure always have null values in their value cells. Except as described below, left sentinel and the spare nodes (if any) to the logical left thereof have nullL in their value fields, while right sentinel and spare nodes (if any) to the logical right thereof have a corresponding nullR in their value fields. Notwithstanding the above, the most extreme node at each end of the linked-list structure holds the nullX in its value field rather than the usual left or right null value.

Terms such as always, never, all, none, etc. are used herein to describe sets of consistent states presented by a given computational system. Of course, persons of ordinary skill in the art will recognize that certain transitory states may and do exist in physical implementations even if not presented by the computational system. Accordingly, such terms and invariants will be understood in the context of consistent states presented by a given computational system rather than as a requirement for precisely simultaneous effect of multiple state changes. This "hiding" of internal states is commonly referred to by calling the composite operation "atomic", and by allusion to a prohibition against any process seeing any of the internal states partially performed.

Referring more specifically to FIG. 1, deque 101 is represented using a subset of the nodes of doubly-linked list 102. Left and right identifiers (e.g., left hat 103 and right hat 104) identify respective left and right sentinel nodes 105 and 106 that delimit deque 101. In the illustration of FIG. 1, a single spare node 107 is provided beyond right sentinel node 106. In the drawings, we use LN to represent nullL, RN to represent nullR, and X to represent the nullX used in nodes at the ends of the linked-list. Values are represented as "V1", "V2", etc. In general, the value field of the illustrated structure may include either a literal value or a pointer value. Particular data structures identified by pointer values are, in general, application specific. Literal values may be appropriate for some applications and, in some realizations, more complex node structures may be employed. Based on the description herein, these and other variations will be appreciated by persons of ordinary skill in the art. Nonetheless, and without loss of generality, the simple node structure defined above is used for purposes of illustration.

Most operations on a deque are performed by "moving a hat" (i.e., redirecting a sentinel pointer) between a sentinel node and an adjacent node, taking advantage of the presence of spare nodes to avoid the expense of frequent memory allocation calls. One way to understand operation of the deque is to contrast its operation with other algorithms that push a new element onto a linked-list implemented data structure by creating a new node and then splicing the new node onto one end. In contrast, embodiments in accordance with the present invention treat a doubly-linked list structure more as if it were an array. For example, addition of a new element to the deque can often be supported by simple adjustment of a pointer and installation of the new value into a node that is already present in the linked list. However, unlike a typical array-based algorithm, which, on exhaustion of pre-allocated storage, must report a full deque, embodiments in accordance with the present invention allow expansion of the linked-list to include additional nodes. In this way, the cost of splicing a new node into the doubly-linked structure may be amortized over the set of subsequent push and pop operations that use that node to store deque elements. In this manner, embodiments in accordance with the present invention combine some of the most attractive features of array-based and linked-list-based implementations.

Figure 2:
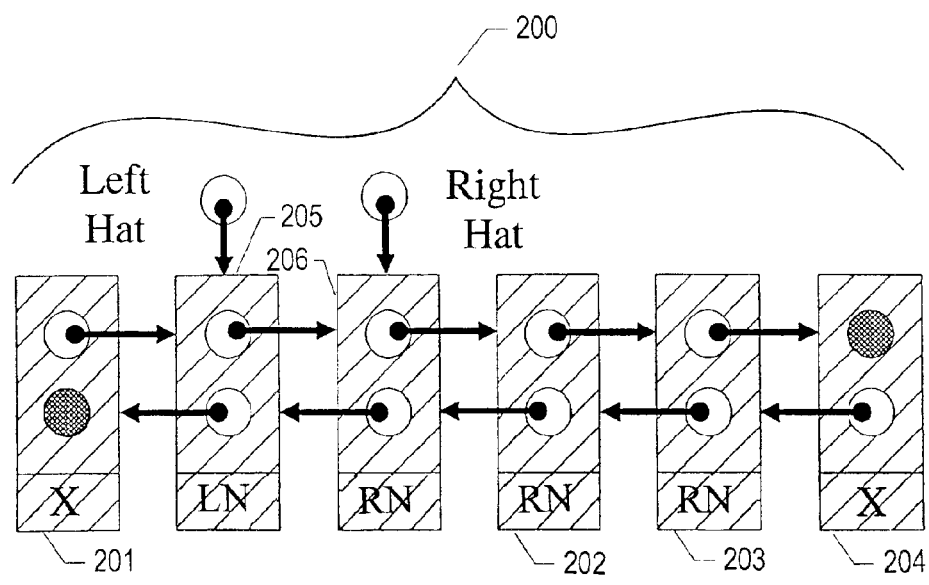
FIG. 2 depicts an empty deque state of a linked-list structure encoding a double-ended queue (deque) in accordance with an exemplary embodiment of the present invention.

In addition to value-encoding nodes (if any), two sentinel nodes are also included in a linked-list representation in accordance with the present invention. The sentinel nodes are simply the nodes of the linked-list identified by LeftHat and RightHat. Otherwise, the sentinel nodes are structurally-indistinguishable from other nodes of the linked-list. When the deque is empty, the sentinel nodes are a pair of nodes linked adjacent to one another. FIG. 2 illustrates a linked-list 200 encoding an empty deque between sentinel nodes 205 and 206. In general, contents of the deque consist of those nodes of the linked-list that fall 'between' the sentinels.

Besides the sentinels and the nodes that are logically "in the deque," additional spare nodes may also be linked into the list. These spare nodes, e.g., nodes 201, 202, 203 and 204 (see FIG. 2), are logically "outside" the deque, i.e., beyond a respective sentinel. In the illustration of FIG. 1, node 107 is a spare node. In general, the set of nodes (including deque, sentinel and spare nodes) are linked by right and left pointers, with terminating null values in the right pointer cell of the right "end" node (e.g., node 204) and the left pointer cell of the left "end" node (e.g. node 201).

An empty deque is created or initialized by stringing together a convenient number of nodes into a doubly-linked list that is terminated at the left end with a null left pointer and at the right end with a null right pointer. A pair of adjacent nodes are designated as the sentinels, with the one pointed to by the left sentinel pointer having its right pointer pointing to the one designated by the right sentinel pointer, and vice versa. Both spare and sentinel nodes have null value fields that distinguish them from nodes of the deque. FIG. 2 shows an empty deque with a few spare nodes. Right- and left-end nodes (e.g., nodes 201 and 204) of the linked-list structure use the nullX variant of the null value, while remaining spare and sentinel nodes (if any) inside the right- and left-end nodes encode an appropriate variant (nullL for left-side ones and nullR for right-side ones).

Access Operations

The description that follows presents an exemplary non-blocking implementation of a deque based on an underlying doubly-linked-list data structure wherein access operations (illustratively, push_right, pop_right, push_left and pop_left) facilitate concurrent access. Exemplary code and illustrative drawings will provide persons of ordinary skill in the art with detailed understanding of one particular realization of the present invention; however, as will be apparent from the description herein and the breadth of the claims that follow, the invention is not limited thereto. Exemplary right-hand-side code is described with the understanding that left-hand-side operations are symmetric. Use herein of directional signals (e.g., left and right) will be understood by persons of ordinary skill in the art to be somewhat arbitrary. Accordingly, many other notational conventions, such as top and bottom, first-end and second-end, etc., and implementations denominated therein are also suitable. With the foregoing in mind, pop_right and push_right access operations and related right-end spare node maintenance operations are now described.

An illustrative push_right access operation in accordance with the present invention follows:

```
push_right (val newVal) {
    while (true) {
        rh = RightHat;
        if (DCAS (&RightHat, &rh->value, rh, nullR,
                  rh->R, newVal) )
            return "okay";
        else if (rh->value == nullX)
            if (!add_right_nodes (handyNumber) )
                return "full";
    }
}
```

Figure 4:
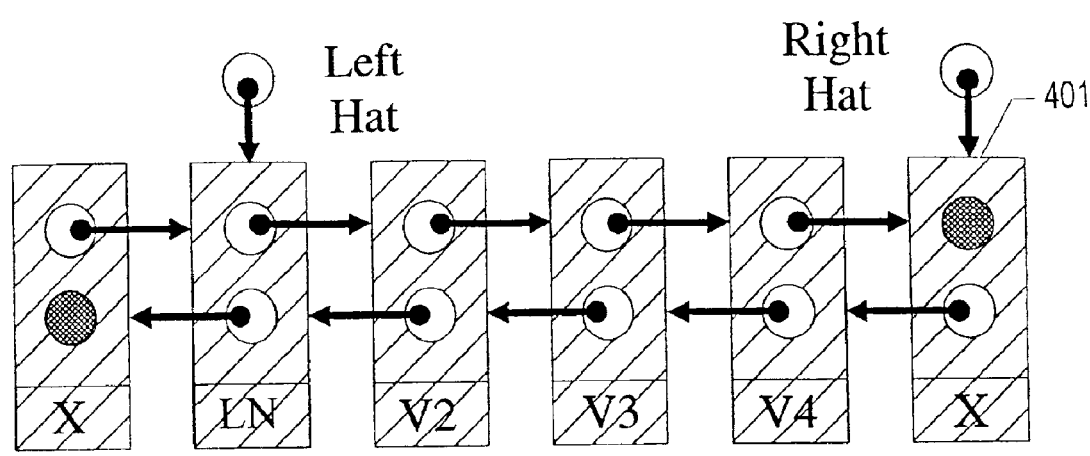
FIG. 4 depicts a state of a linked-list structure in which spare nodes are unavailable to support a push_right operation on a deque.

To perform a push_right access operation, a processor uses the DCAS in lines 4–5 to attempt to move the right hat to the right and replace the right null value formerly under it (nullR) with the new value passed to the push operation (newVal). If the DCAS succeeds, the push has succeeded. Otherwise, the DCAS failed either because the hat was moved by some other operation or because there is not an available cell—a condition indicated by a nullX in the value cell of the sentinel node. FIG. 4 illustrates a linked-list state that does not have room for a push right When the sentinel node is flagged by holding the terminal nullX value, line 7 of push_right invokes a spare node maintenance operation (add_right_nodes) to allocate and link one or more spare nodes into the list. Operation of spare node maintenance operations is described in greater detail below. After adding storage, the push_right operation is retried from the beginning. If one or more other executions of push_right operations intervene and consume the newly allocated nodes, this retry behavior will again note the shortage and again call upon add_right_nodes to allocate more nodes until eventually there is at least one.

Figure 3A:
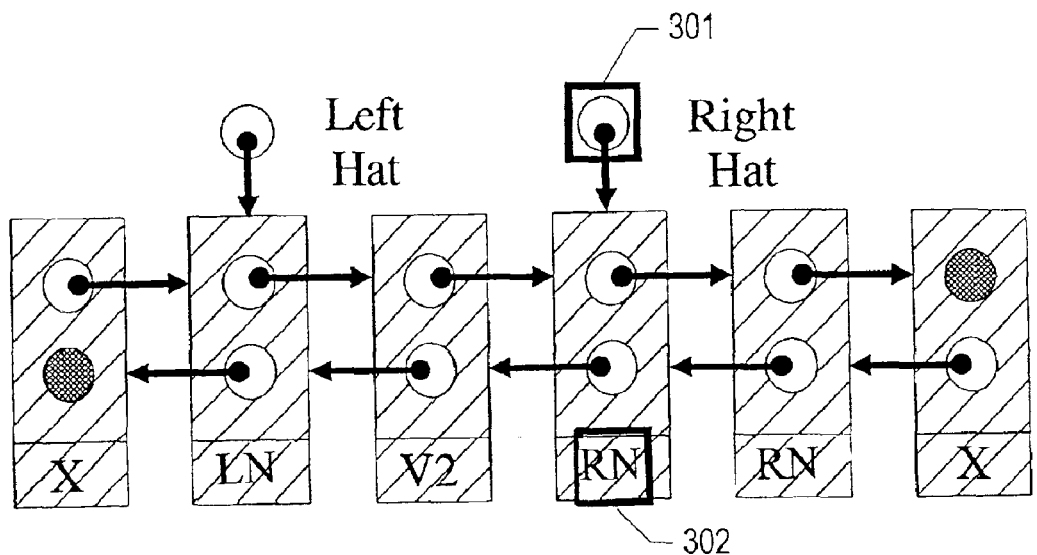
FIGS. 3A and 3B depict illustrative states of a linked-list structure encoding a deque in accordance with an exemplary embodiment of the present invention.
Figure 3B:
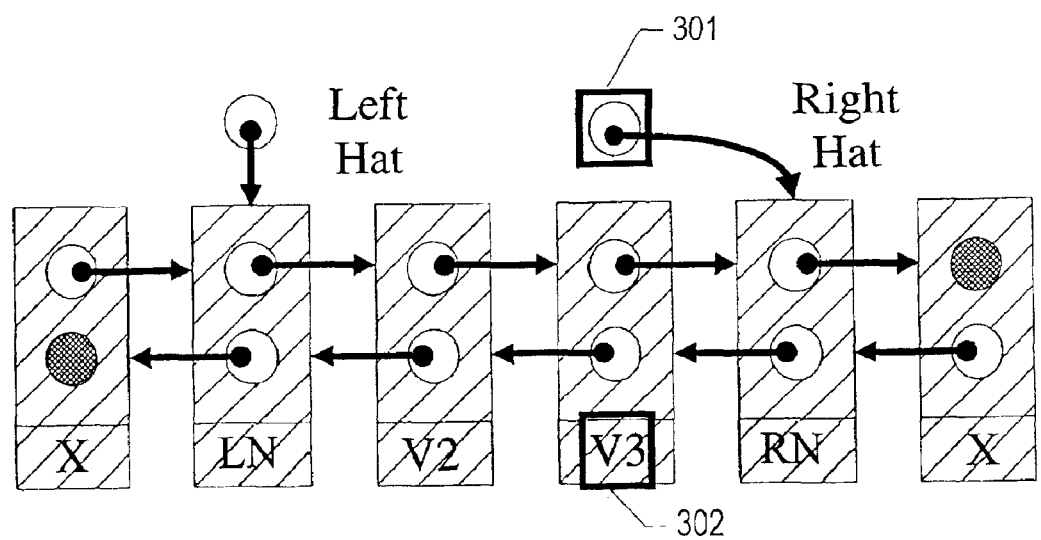

FIGS. 3A and 3B illustrate states of the linked-list and deque before and after a successful DCAS of the push_right access operation. In the illustrations, heavy black rectangles are used to indicate storage locations (i.e., right hat 301 and value field 302 of the node identified thereby) operated upon by the DCAS. The DCAS fails if the right hat has been moved or if the value cell is found to be holding a value other than nullR. If the value was nullX, spare nodes are added and the push is retried. In both other cases (hat movement and non-null value), the push_right operation loops for another attempt.

An illustrative pop_right access operation in accordance with the present invention follows:

```
val pop_right ( ) {
    while (true) {
        rh = RightHat;
        rhL = rh->L;
        result = rhL->value;
        if ( (result==nullL)  ||  (result==nullX) ) {
            if(DCAS (&RightHat, &rhL->value,rh,result,rh,result) )
                return "empty";
        } else if (DCAS(&RightHat,&rhL->value,
                rh,result,rhL,nullR) )
            return result;
    }
}
```

Figure 5A:
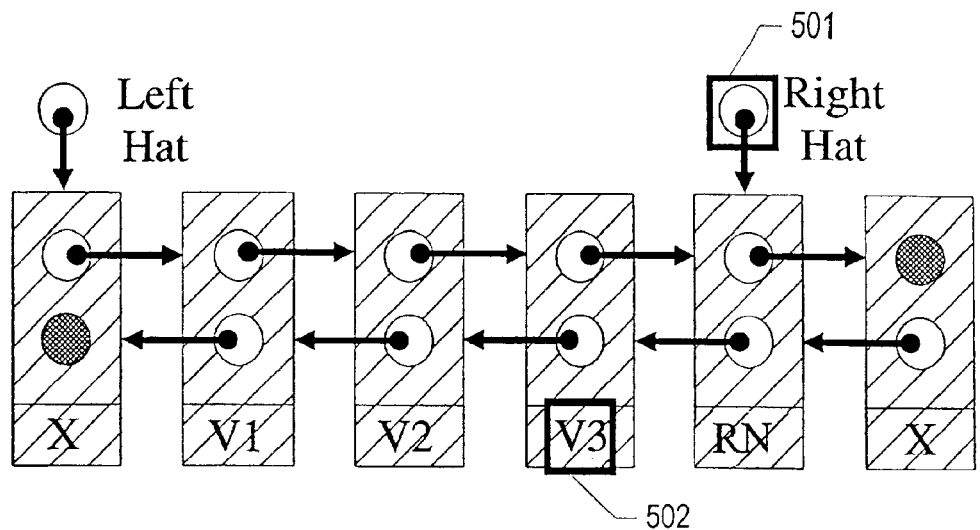
FIGS. 5A and 5B depict illustrative states of a linked-list structure encoding a deque in accordance with an exemplary embodiment of the present invention.
Figure 5B:
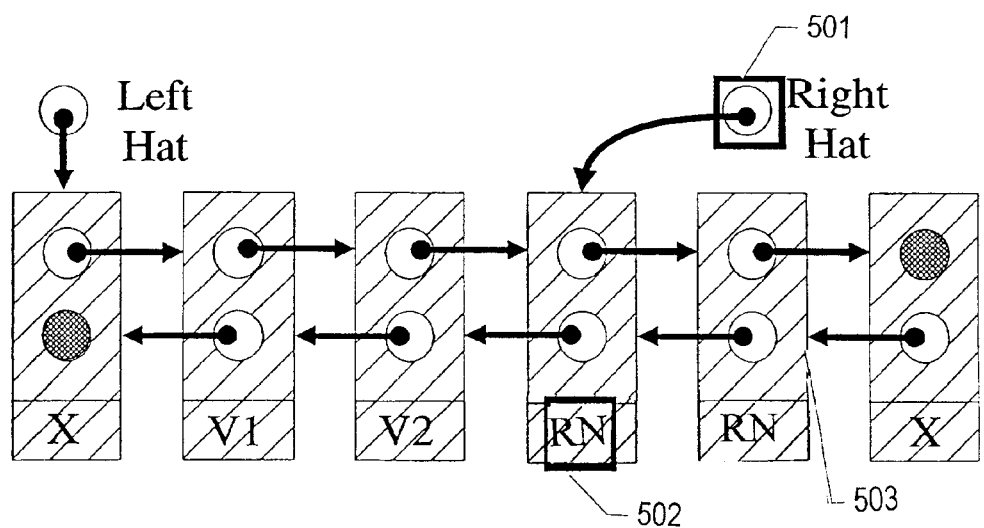

To perform a pop_right access operation, a processor first tests for an empty deque (see lines 3–6). Note that checking for empty does not access the other hat, and therefore does not create contention with operations at the other end of the deque. Because changes are possible between the time we read the RightHat and the time we read the L pointer, we use a DCAS (line 7) to verify that these two pointers, are at the same moment, equal to the values individually read. If the deque is non-empty, execution of the pop_right operation uses a DCAS to insert a nullR value in the value field of a node immediately left of the right sentinel (i.e., into rhL->value, where rhL=rh->L) and to move the right sentinel hat onto that node. FIGS. 5A and 5B illustrate states of the linked-list and deque before and after a successful DCAS of the pop_right access operation. In particular, FIG. 5A illustrates operation of the DCAS on the right hat store 501 and value field 502. If the DCAS succeeds, the value (illustratively, V3) removed from the popped node is returned. Note that a successful DCAS (and pop) contributes a node (illustratively, node 503) to the set of spare nodes beyond the then-current right sentinel. A DCAS failure means that either the hat has been moved by another push or pop at the same end of the queue or (in the case of a single element deque) the targeted node was popped from the opposing end of the deque, In either case, the pop_right operation loops for another attempt.

Figure 6:
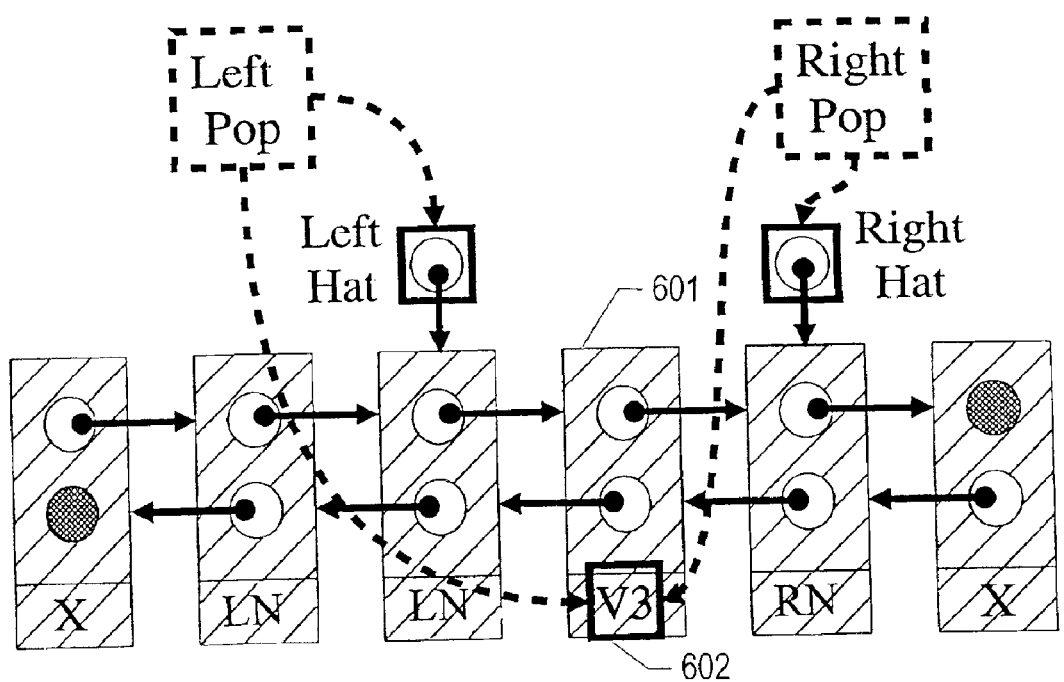
FIG. 6 depicts a nearly empty deque state of a linked-list structure encoding a double-ended queue (deque) in accordance with an exemplary embodiment of the present invention. Competing pop_left and pop_right operations contend for the single node of the nearly empty deque.

There is one instance in this implementation of the deque where access operations at opposing ends of the deque may conflict, namely, if the deque contains just one element and both a pop_right and pop_left are attempted 'simultaneously'. FIG. 6 illustrates the DCAS operations of competing pop_right and pop_left operations. Because of the semantics of the DCAS only one instance can succeed and the other necessarily fails. For example, in the illustration of FIG. 6, either the pop_right succeeds in returning the contents of value store 602 and updating the right hat to identify node 601 or the pop_left succeeds in returning the contents of value store 602 and updating the left hat to identify node 601. The pop operation that wins gets the lone node and returns its value (see lines 9–10).

Spare Node Maintenance Operations

The push operations described above work smoothly so long as the linked-list includes sufficient spare nodes. However, pushes that exceed pops at a given end of the deque will eventually require addition of nodes to the linked-list. As with access operations, exemplary code and illustrative drawings will provide persons of ordinary skill in the art with detailed understanding of one particular realization of the present invention; however, as will be apparent from the description herein and the breadth of the claims that follow, the invention is not limited thereto. Exemplary right-hand-side code is described with the understanding that left-hand-side operations are symmetric.

FIG. 4 illustrates a linked-list state in which no additional nodes are available beyond right sentinel node 401 to support successful completion of a push_right operation. Depending on the particular implementation, addition of spare nodes may be triggered on discovery that spare nodes have been exhausted at the relevant end, or additions may be triggered at a level that allows a larger buffer of spare nodes to be maintained. In general, threshold points for spare node additions (and removal) are implementation dependent.

An illustrative add_right_nodes operation in accordance with the present invention follows:

```
boolean add_right_nodes(int n) {
    newNodeChain = allocate_right_nodes(n);
    if (newNodeChain == null) return false;
    while (true) {
        Rptr = RightHat;
        while ( (next = Rptr->R) != null)
            Rptr = next;
        newNodeChain->L = Rptr;
        if (DCAS(&Rptr->R, &Rptr->value, null, nullX,
                newNodeChain, nullR) )
            return true;
    }
}
```

Figure 7:
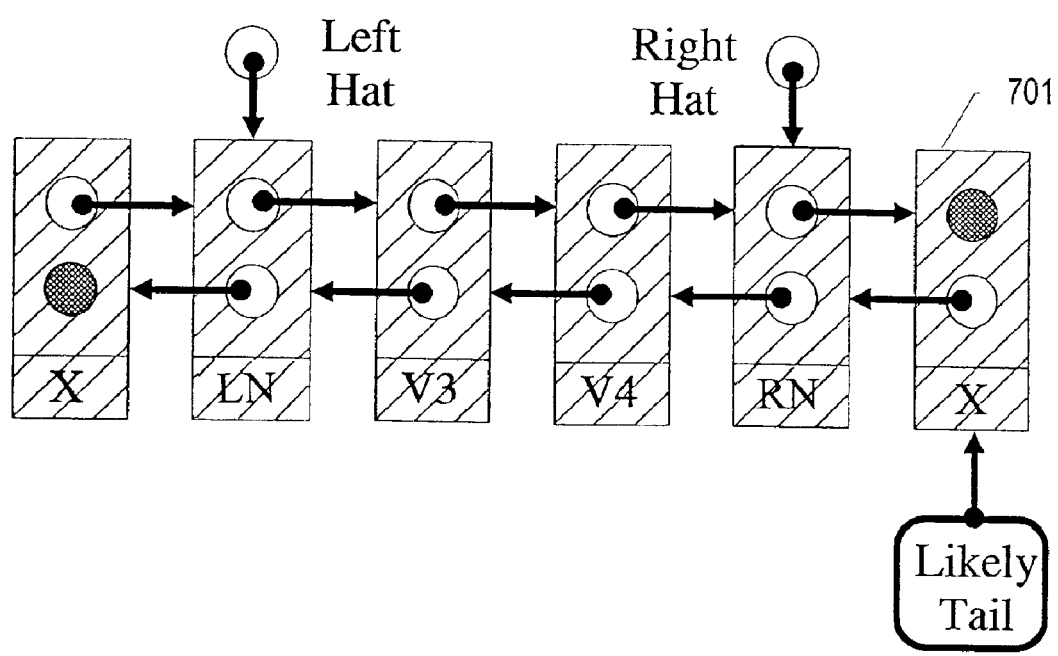
FIG. 7 depicts identification of the likely right tail of a linked-list structure encoding a double-ended queue (deque) in accordance with an exemplary embodiment of the present invention.

FIG. 7 illustrates a linked-list state upon which an invocation of add_right_nodes may operate. A single spare node exists beyond right sentinel and add_right_nodes follows right pointers (see lines 5–7) from the right sentinel to find the node with a null right pointer. In the illustrated case, node 701 is the resultant Rptr. However, because the linked-list (and encoded deque) is a concurrent shared object, other operations may have intervened and Rptr may no longer be the tail of the linked-list.

Figure 8:
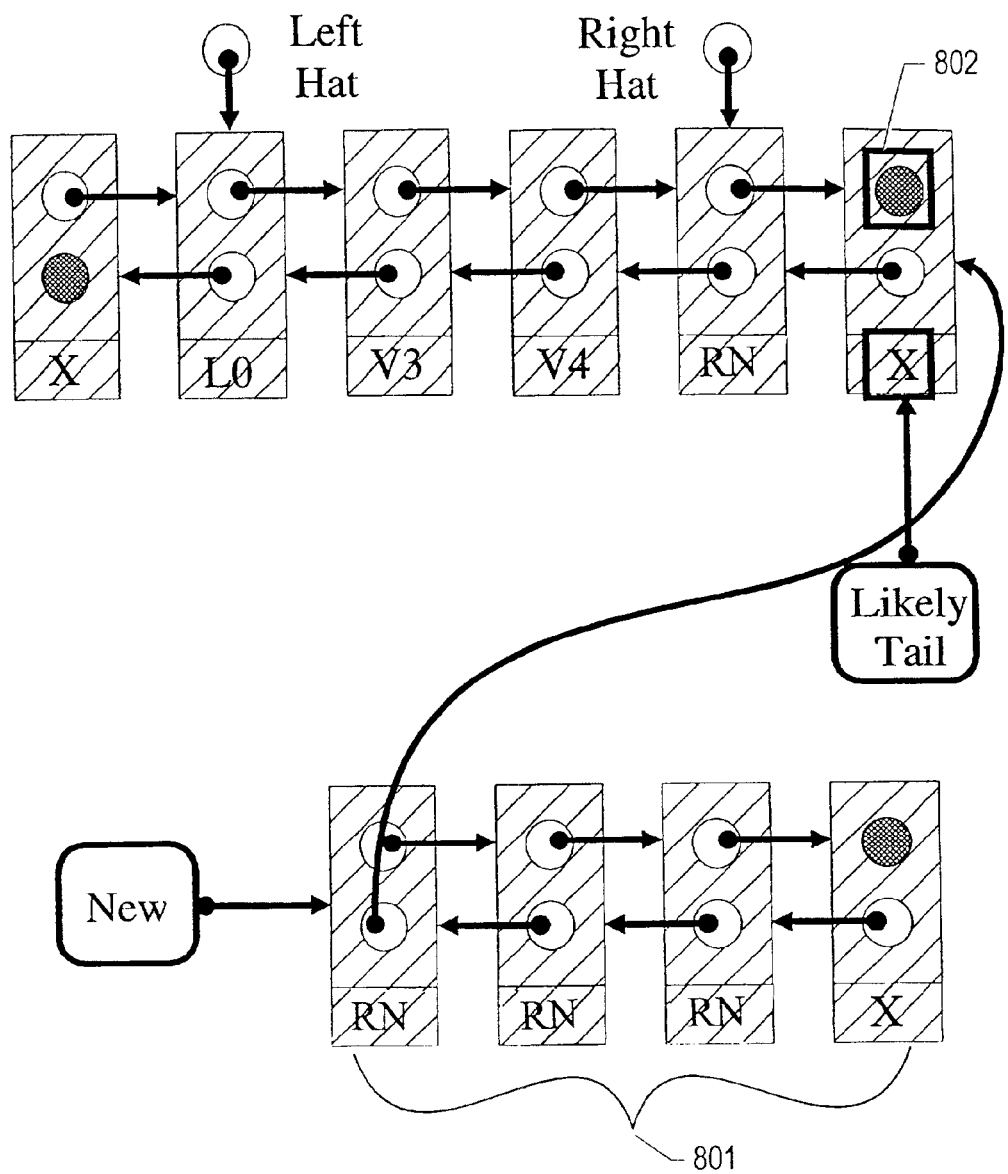
FIG. 8 depicts the state of a linked-list structure encoding a deque before a synchronization operation of an add_right_nodes operation in accordance with an exemplary embodiment of the present invention.

A service routine, allocate_right_nodes, is used to allocate storage and initialize a doubly-linked node chain with null values in each value field (nullX in the rightmost one, nullR in the rest). The chain of nodes 801 is terminated by a null right pointer in the rightmost node (see FIG. 8). An exemplary version of allocate_right_nodes is included below to illustrate the desired results. In general, suitable lower level storage allocation techniques will be appreciated by persons of ordinary skill in the art. For example, one efficient implementation requests N nodes worth of storage as a single contiguous block and then builds the linked list and node structure within the contiguous block. In this way, a functionally equivalent data structure is returned with more efficient utilization of an underlying storage allocation system.

Figure 9:
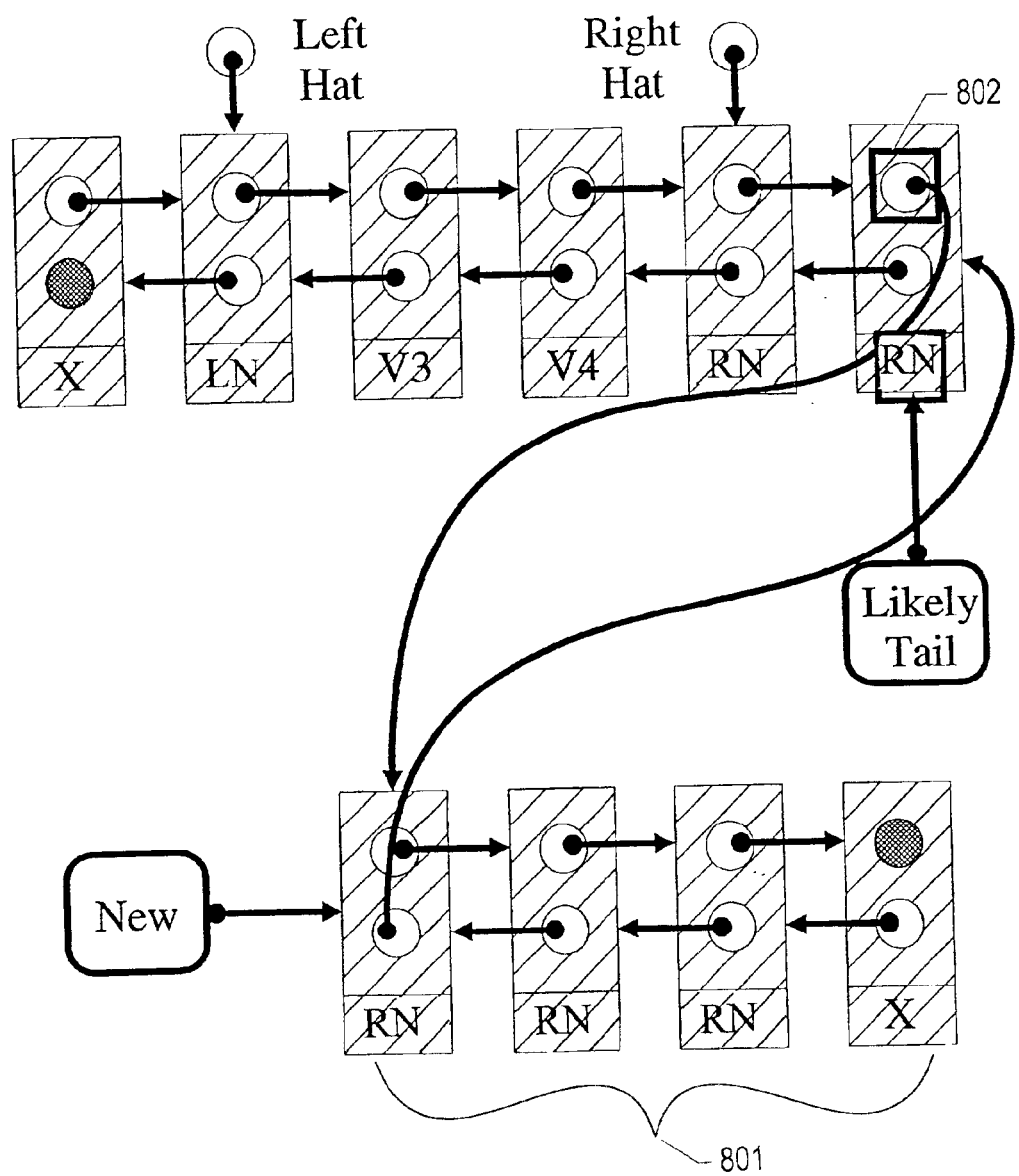
FIG. 9 depicts the state of a linked-list structure of FIG. 8 after success of the synchronization operation of the add_right_nodes operation.

In line 8 of add_right_nodes, we see the left pointer of the leftmost node of new chain 801 being set to point to the likely tail node of the deque structure. A DCAS in lines 9–10 then attempts to replace the null right pointer of the likely tail node with a link to the new structure and replaces the nullX in its value cell with a nullR. If the DCAS succeeds, the new storage is spliced onto the node chain as illustrated in FIG. 9. This DCAS may fail if some processor concurrently splices storage onto the likely tail node. Accordingly, a failed DCAS causes add_right_nodes to loop back and try again to attach the new storage.

```
Node allocate_right_nodes9int howMany) {
    lastNode = new Node ( );
    if (lastNode == null) return null;
    lastNode->R = null;
    lastNode->value = nullX;
    for (int i=1; i<howMany; i++) {
        newNode = new Node ( );
        if (newNode == null) break;
        newNode->value = nullR;
        newNode->R = lastNode;
        lastNode->L = newNode;
        lastNode = newNode;
    }
    lastNode->L = null;
    return lastNode;
}
```

Additional Refinements

While the above-described implementation of a dynamically sized deque illustrates some aspects of some realizations in accordance with the present invention, a variation now described provides certain additional benefits. For example, spare node maintenance facilities are extended to allow removal of excess spare nodes and a possible behavior that results in creation of a "spur" is handled. Related modifications have been made to push and pop access operations and to the set of distinguishing values stored in the value field of a node but which are not pushed onto the deque.

As before, the deque implementation is based on a doubly-linked list representation. Each node contains left and right pointers and a value field, which can store a value pushed onto the deque or store one of several special distinguishing values that are never pushed onto the deque. In addition to the distinguishing values nullL and nullR (hereafter LN and RN), left and right variants LX and RX of a terminal value (previously nullX) and two additional distinguishing values, LY and RY have been defined. As before, the list contains one node for each value in the deque, plus additional nodes that can be used for values in the future, and which are used to synchronize additions to and removals from the list.

Values currently in the deque are stored in consecutive nodes in the list, and there is at least one additional node on each side of the nodes that encode the deque's state. Each node other than those containing values of the deque state is distinguished by one of the special distinguishing values listed above. The node directly to the right (left) of the rightmost (leftmost) value is called the right (left) sentinel. Except in a special case, which is described later, two shared pointers, hereafter RHat and LHat, point to the right and left sentinels, respectively. For an empty state of the deque, left and right sentinels are adjacent. Thus, FIG. 10A depicts one representation of an empty deque.

As before, the implementation is completely symmetric. Accordingly, we therefore restrict our presentation to the right side with the understanding that left side representations and operations are symmetric. Referring then to FIG. 10B, a list representation 1001 of a particular deque state 1005 that includes two values, A and B, is illustrated. In general, a sequence of distinguishing values appears in nodes of the list representation beginning with a sentinel node (e.g., right sentinel 1002) and continuing outward (e.g., following right pointers to nodes 1003 and 1004). The sequence includes zero or more "right null" values, distinguished by the RN value, followed by a "right terminator" value, distinguished by the RX value. In the illustration of FIG. 10B, two nodes containing RN values are followed by a terminating node 1004. In general, zero or more additional nodes may appear to the right of a first node containing an RX value. These additional nodes (if any) can be distinguished by an RN, RX, or RY value and exist because of a previous removal operation, which is explained later. As described below, we use the terminating RX value to avoid further use of these nodes so that they can eventually become garbage.

Figure 10A:
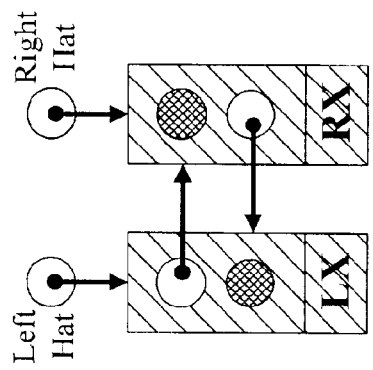
Figure 10C:
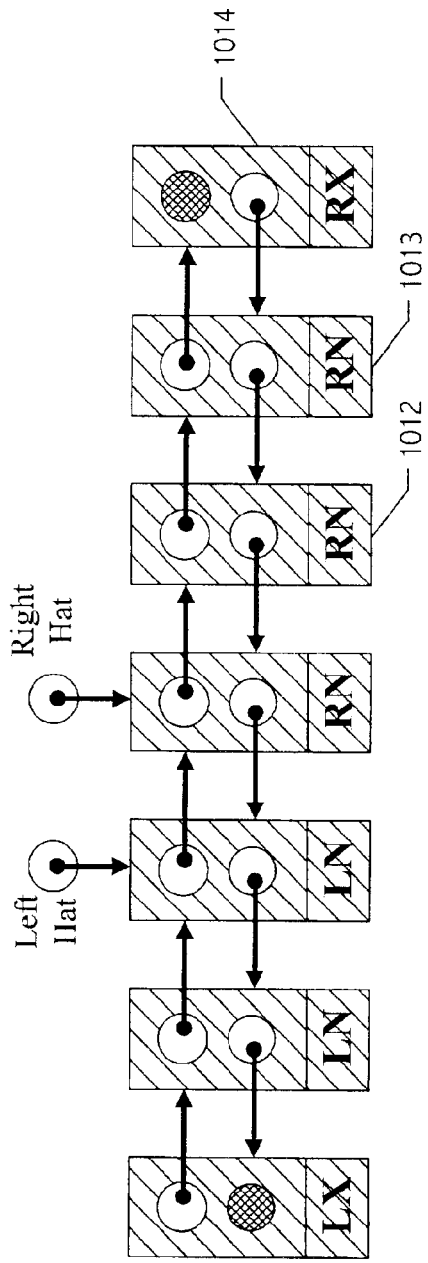

In the illustration of FIG. 10B, the right null nodes (i.e., those marked by RN) between the rightmost value and the first RX node are "spare" nodes, which can be used for new values that are pushed onto the deque from the right. FIG. 10C shows another representation of an empty deque. In contrast with the representation of FIG. 10A, this list state includes spare nodes onto which values can be pushed in the future.

Access Operations

We begin by describing the operation of "normal" push and pop operations that do not encounter any boundary cases or concurrent operations. Later, we describe special cases for these operations, interaction with concurrent operations, and operations for growing and shrinking the list. As before, exemplary right-hand-side code is described with the understanding that left-hand-side operations are symmetric and the choice of a naming convention, i.e., "right" (and "left"), is arbitrary.

An illustrative implementation of a pushRight access operation follows:

```
pushRight (valtype v) {
    while (true) {
        rh = RHat;
        rhR = rh->R;
        if (rhR != NULL &&
                DCAS(&RHat,&rh->V,rh,RN,rhR,v) )
            return OKval;
        else if (rh->V == RX) {
            if (!add_right (some_number) )
                return FULLval;
        } else unspur_right( );
    }
}
```

The pushRight access operation turns the current right sentinel into a value node and changes RHat to point to the node to the right of the current right sentinel, thereby making it the new right sentinel. In the illustrated implementation, this objective is achieved by reading RHat to locate the right sentinel (line 3), by determining the next node to the right of the right sentinel (line 4) and then using a DCAS primitive (line 6) to atomically move RHat to that next node and to change the value in the previous right sentinel from the distinguishing value RN to the new value, v.

Figures 10D, 10E:
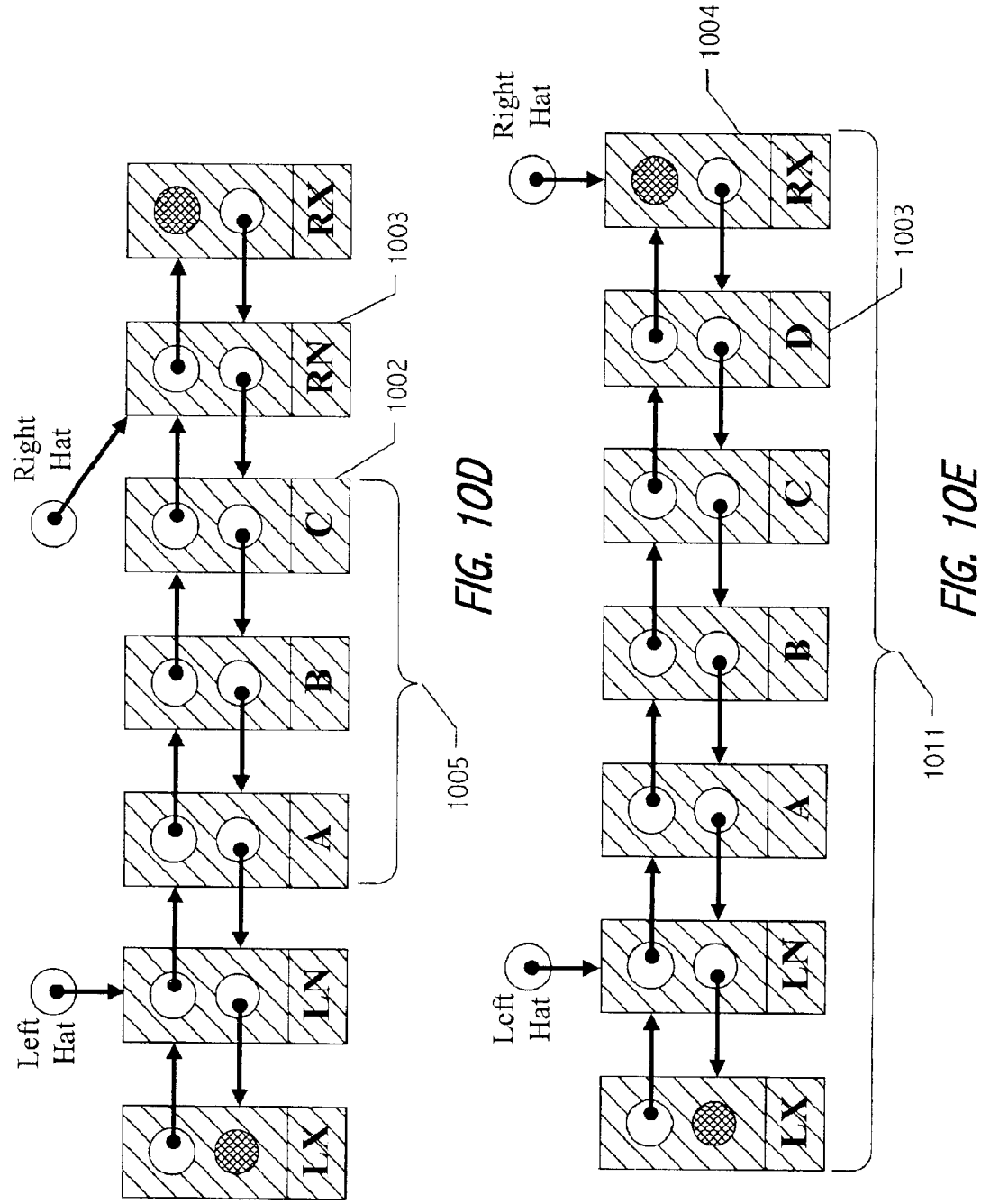

For example, starting from the deque and list state shown in FIG. 10B, execution of a pushRight (C) operation results in the state shown in FIG. 10D. In particular, node 1002 contains the value, C, pushed onto deque 1005 and the pointer RHat identifies node 1003 as the right sentinel. Subsequent execution of a pushRight (D) operation likewise results in the state shown in FIG. 10E. After successful completion of the pushRight (D) operation, node 1003 contains the value, D, and the pointer Rhat identifies node 1004 as the right sentinel. As illustrated, node 1004 is distinguished by the RX terminator value. Note that, given the list state 1011 illustrated in FIG. 10E, a further rightPush would fail to find a spare node marked by the distinguishing value RaN, and so this simple scenario would not succeed in pushing the new value. In fact, there are several possible reasons that the simple pushRight operation described above might not succeed, as discussed below.

First, the DCAS primitive can fail due to the effect of a concurrent operation, in which case, pushRight simply retries. Such a DCAS failure can occur only if another operation possibly including another pushRight operation) succeeds in changing the deque state during execution of the pushRight operation. Accordingly, lock-freedom is not compromised by retying. Otherwise, execution of the pushRight operation may fail because it detects that there is no node available to become the new right sentinel (line 5), or because the distinguishing value in the old sentinel is not RN (in which case the DCAS of line 6 will fail). In such a case, it may be that we have exhausted the right spare nodes as illustrated in FIG. 10E. The pushRight access operation checks for this case at line 8 by checking if the right sentinel contains the terminating value RX. If so, it calls add_right (line 9) to grow the list to the right (by some_number of nodes) before retrying. In general, some_number is an implementation-dependent, non-zero positive integer. Operation of the add_right operation and the special case dealt with at line 11 are each described later.

An illustrative implementation of a popRight access operation follows:

```
popRight ( ) {
    while (true) {
        rh = RHat;
        rhL = rh->L;
        if (rhL!=NULL) {
            result = rhL->V;
            if (result != RN && result != RX &&
                result != LY && result != RY)
                if (result == LN || result == LX) {
                    if (DCAS(&RHat,&rhL->V,rh,result,rh,result) )
                        return EMPTYval;
                } else if (DCAS(&RHat,&rhL->V,rh,result,rhL,RN) )
                    return result;
        }
    }
}
```

The popRight access operation locates the rightmost value node of the deque and turns this node into the right sentinel by atomically changing its value to RN and moving the RHat to point to it. For example, a successful rightPop access operation operating on the list and deque state shown in FIG. 10B results in the state shown in FIG. 10F.

The popRight access operation begins by reading the pointer RHat to locate the right sentinel (line 3), and then reads (at line 4) the left pointer of this node to locate the node containing the rightmost value of the deque. The popRight operation reads the value stored in this node (line 6). It can be shown that the value read can be one of the distinguishing values RN, RX, LY, or RY only in the presence of successful execution of a concurrent operation. Accordingly, the popRight operation retries if it detects any of these values (lines 7–8). However, if the popRight operation read either a left null or left terminating value (i.e., either LN or LX), then either the deque is empty (i.e., there are no values between the two sentinels) or the popRight operation read values that did not exist simultaneously due to execution of a concurrent operation.

To disambiguate, the popRight access operation uses a DCAS primitive (at line 10) to check whether the values read from RHat and the value field of the rightmost value node exist simultaneously in the list representation. Note that the last two arguments to the DCAS are the same as the second two, so the DCAS does not change any values, Instead, the DCAS checks that the values are the same as those read previously. If so, the popRight operation returns "empty" at line 11. Otherwise, the popRight operation retries. Finally, if the popRight operation finds a value other than a distinguishing value in the node to the left of the right sentinel, then it uses a DCAS primitive (at line 12) to attempt to atomically change this value to RN (thereby making the node that stored the value to be popped available for subsequent pushRight operations) and to move RHat to point to the popped value node. If the DCAS succeeds in atomically removing the rightmost value and making the node that stored it become the new right sentinel, the value can be returned (line 13). Otherwise, the popRight operation retries.

As before, if the deque state includes two or more values, symmetric left and right variants of the above-described pop operation execute independently. This independence is an advantage over some DCAS-based deque implementations, which do not allow left and right operations to execute concurrently without interfering with one another. However, when there are zero or one values in the deque, concurrently executed popLeft and popRight access operations do interact. For example, if popLeft and popRight access operations operate concurrently on a deque state such as that illustrated in FIG. 10F, then one of the access operations should succeed in popping the value (e.g., A), while the other should receive an indication that the deque is empty (assuming no other concurrent operations). Our implementation handles this case correctly because the pop operations use a DCAS primitive to change the value they are attempting to pop to a distinguishing null value (e.g., LN or RN, depending on the side from which the pop operation is attempted). The pop operation that executes its DCAS first succeeds while the other fails.

Spare Node Maintenance Operations

As before, the push operations described above work smoothly so long as the linked-list includes sufficient spare nodes. However, pushes that exceed pops at a given end of the deque will eventually require addition of nodes to the linked-list. In addition, removal of some of the unused nodes that are beyond the sentinels (e.g., to the right of the right sentinel) may be desirable at a deque end that has accumulated an excessive number of spare nodes resulting from pops that exceed pushes.

We next describe an implementation of an add_right operation that can be used to add spare nodes to the right of the linked list for use by subsequently executed pushRight access operations. One suitable implementation is as follows:

```
add_right(int n) {
    chain = alloc_right (n);
    if (chain == NULL) return false;
    while (true) {
        rptr = RHat;
        while (rptr !=NULL && (v = rptr->V) == RN)
            rptr = rptr->R;
        if (v == RY)
            unspur_right ( );
        else if (rptr != NULL && v == RX) {
            chain->L = rptr;
            rrptr = rptr->R;
            if (DCAS(&rptr->R,&rptr->V,rrptr,RX,chain,RN) )
                return true;
        }
    }
}
```

The add_right operation can be called directly if desired. However, as illustrated above, the add_right operation is called by the pushRight access operation if execution thereof determines that there are no more right null nodes available (e.g., based on observation of a terminating RX value in the right sentinel at line 9 of the illustrated pushRight implementation). In the illustrated implementation, the add_right operation takes an argument that indicates the number of nodes to be added. In the illustrated implementation, add_right begins by calling alloc_right to construct a doubly-linked chain of the desired length. Any of a variety of implementations are suitable and one such suitable implementation follows:

```
alloc_right(int n) {
    last = new Node(RX);
    if (last == NULL) return NULL;
    for (i=0; i<n; i++) {
        newnode = new Node(RN);
        if (newnode == NULL) break;
        newnode->R = last;
        last->L = newnode;
        last=newnode;
    }
    last->L = NULL;
    return newnode;
}
``` where we have assumed a constructor that initializes a new node with a value passed thereto. Accordingly, the rightmost node in of a newly allocated chain encodes an RX value, and all others encode an RN value. Implementation of an alloc_right operation is straightforward because no other process can concurrently access the chain as it is constructed from newly-allocated nodes.

Next, the add_right operation attempts to splice the new chain onto the existing list. For example, given the list and deque state illustrated by FIG. 10E, the add_right operation attempts to replace both the right pointer in the right terminating node (e.g., node 1004, FIG. 10E) with a pointer to the new chain and the terminating RX value thereof with an RN value. If successfull, the existing right terminating node becomes just another spare node and the rightmost node of the new chain is the new right terminating node. These replacements are performed atomically using the DCAS primitive at line 13 of the add_right operation.

In preparation for a splice, the add_right operation first traverses the right referencing chain of the list from the right sentinel, past the nodes encoding a right null distinguishing value RN (lines 5–7), looking for an RX terminating value (line 10). When the executing add_right operation finds the RX terminating value, it attempts to splice the new chain onto the existing list, as described above, by using a DCAS primitive (line 13). In preparation, the add_right operation first sets the left pointer of the leftmost node of its new chain to point back to finds the previously found node with an RX terminating value (line 11) so that, if the DCAS succeeds, the doubly-linked list will be complete, and then reads (line 12) the current right pointer, rrptr, for use in the DCAS.

Because of the possibility of concurrent operations, traversal of the right referencing chain may encounter any value, e.g., a deque value or one of the other distinguishing values, before finding the a node containing the RX terminating value. In most such cases, the add_right operation simply repeats its search again after re-reading the RHat value (at line 5). As usual, a retry does not compromise lock-freedom because a concurrent operation that altered the list state must have succeeded. However, a special case can arise even in the absence of concurrent operations. This case is handled at lines 8–9 and is explained below following discussion of a remove_right operation.

Some realizations may also include an operation to remove excess spare nodes. In the implementation described below, a remove_right operation is used to remove all but a specified number of the spare right nodes. Such a remove_right operation can be invoked with a number that indicates the maximum number of spare nodes that should remain on the right of the list. If such a remove_right operation fails to chop off part of the list due to concurrent operations, it may be that the decision to chop off the additional nodes was premature. Therefore, rather than insisting that a remove_right implementation retry until it is successful in ensuring there are no more spare nodes than specified, we allow it to return false in the case that it encounters concurrent operations. Such an implementation leaves the decision of whether to retry the remove_right operation to the user. In fact, decisions regarding when to invoke the remove operations, and how many nodes are to remain, may also be left to the user.

In general, storage removal strategies are implementation-dependent. For example, in some implementations it may be desirable to link the need to add storage at one end to an attempt to remove some (for possible reuse) from the other end. Determination that excessive spare nodes lie beyond a sentinel can be made with a counter of pushes and pops from each end. In some realizations, a probabilistically accurate (though not necessarily precise) counter may be employed. In other realizations, a synchronization primitive such as a CAS can be used to ensure a precise count. Alternatively excess pops may be counted by noting the relevant sentinel crossing successive pseudo-boundaries in the link chain. A special node or marker can be linked in to indicate such boundaries, but such an approach typically complicates implementation of the other operations.

Whatever the particular removal strategy, the remove_right operation implementation that follows is illustrative.

```
remove_right (int n) {
    chop = RHat;
    for (i=0; i<n; i++) {
        if (chop->V == RX)
            return true;
        chop = chop->R;
        if (chop == NULL) return true;
    }
    rptr = chop->R;
    if (rptr == NULL) return true;
    if (v = DCAS(&chop->V,&rptr->V,RN,RN,RX,RY) ) {
        CAS(&chop->R,rptr,NULL);
        break_cycles_right(rptr);
    }
    return v;
}
```

We begin by discussing a straightforward (and incorrect) approach to removing spare nodes, and then explain how this approach fails and how the implementation above addresses the failure. In such a straightforward approach, execution of a remove_right operation (such as illustrated above) traverses the right referencing chain of the list beginning at the right sentinel, counting the null nodes that will not be removed, as specified by the argument, n (see lines 2–7). If the traversal reaches the end of the list (at line 7) or a node containing the terminating value RX (see line 4) before counting the specified number of right null nodes, then the remove_right operation returns true, indicating that no excess nodes needed to be excised. Otherwise, the traversal reaches a chop point node that contains the distinguishing right null value RN.

A straightforward approach is to simply use a DCAS primitive to change the right pointer of this chop point node to null, thereby making nodes to the right of the chop point available for garbage collection, and to change the value in the chop point node from RN to RX, thereby preserving the invariant that an RX terminator exists. However, careful examination of the resulting algorithm reveals a problem, illustrated by the following scenario. For purposes of illustration, use in the drawings of a special distinguishing value, RY, (which turns out to be part of a solution) should be ignored.

Consider a pushRight (E) access operation that runs alone from the list and deque state illustrated in FIG. 10B, but which is suspended just before it executes its DCAS (see pushRight, at line 5, above). If the DCAS is executed and succeeds, then the new value, E, will be stored in node 1002, and RHat will be changed to point to node 1003. However, note that the DCAS does not access the right pointer of the current right sentinel (i.e., the right pointer of node 1002). Accordingly, the DCAS may succeed even if this pointer changes, and this is the root of the problem.

Figure 11:
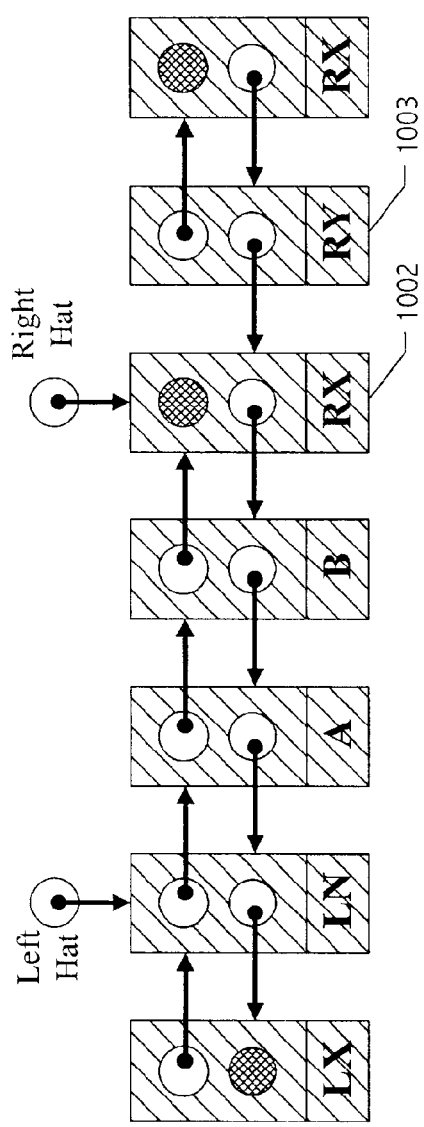
FIG. 11 illustrates a linked-list state after successful completion of a remove_right (0) spare node maintenance operation in accordance with some embodiments of the present invention.
Figure 12:
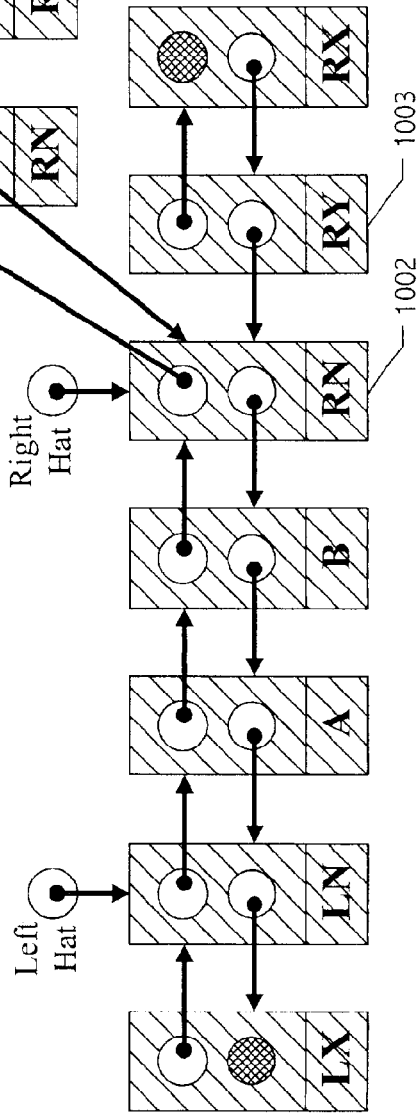
FIG. 12 illustrates a possible linked-list state after successful completion of an add_right (2) spare node maintenance operation in accordance with some embodiments of the present invention.

Suppose now that remove_right (0) is invoked (using the straightforward, but incorrect approach) and that it runs alone to completion, resulting in the state shown in FIG. 11. If the DCAS of the previously suspended pushRight access operation executed now, it would fail because the value in the sentinel node has changed from RN (to RX). However, suppose instead that an add_right (2) is invoked at this point and runs alone to completion. The resulting shared object state is illustrated in FIG. 12. Note that node 1002 encodes a right null value RN. If the DCAS of the previously suspended pushRight access operation executes at this point, it will succeed, resulting in the shared object state illustrated in FIG. 13. Observe that the RHat pointer has failed to properly move along the list 1301 and has instead gone onto a "spur" 1302. This problem can result in incorrect operation because subsequent values pushed onto the right-end of the deque can never be found by popLeft operations.

Our approach to dealing with this problem is not to avoid it, but rather to modify our algorithm so that we can detect and correct it. We separate the removal of nodes into two steps. In the first step, in addition to marking the node that will become the new right terminator with the terminating value RX, we also mark its successor with the special distinguishing value RY. FIG. 11 illustrates the result of such an approach (employed by a remove_right (0) operation implemented as above) operating on the list or shared object state of FIG. 10B. The RY node value is stable. For example, in the illustrative implementation described herein, an RY value marks a node as forever dead, prevents subsequent values from being pushed onto the node, and prevents new chains of nodes from being spliced onto the node. Changing the two adjacent nodes (e.g. nodes 1002 and 1003, respectively, in FIG. 11) to have RX and RY values is performed atomically using a DCAS primitive (line 11, remove_right). The DCAS "logically" chops off the rest of the list, but the pointer to the chopped portion is still intact. Accordingly, in the second step (line 12), we change this pointer to null using a CAS primitive, thereby allowing the chopped portion of the list to eventually be garbage collected.

By employing the distinguishing value RY, an implementation prevents further pushes from proceeding down the old chain. In particular, consider the case of the (i) previously described pushRight (E) access operation that runs alone from the list and deque state illustrated in FIG. 10B, but which is suspended just before it executes its DCAS and (ii) intervening remove_right_nodes and add_right operations alter the state of the concurrent shared object (e.g., as illustrated in FIG. 12). While the previously suspended pushRight (E) access operation still creates the spur, further pushes will not proceed down the chain since the DCAS at line 6 of the above-described pushRight access operation will fail if it does not find the value RN in node 1003.

Figure 13:
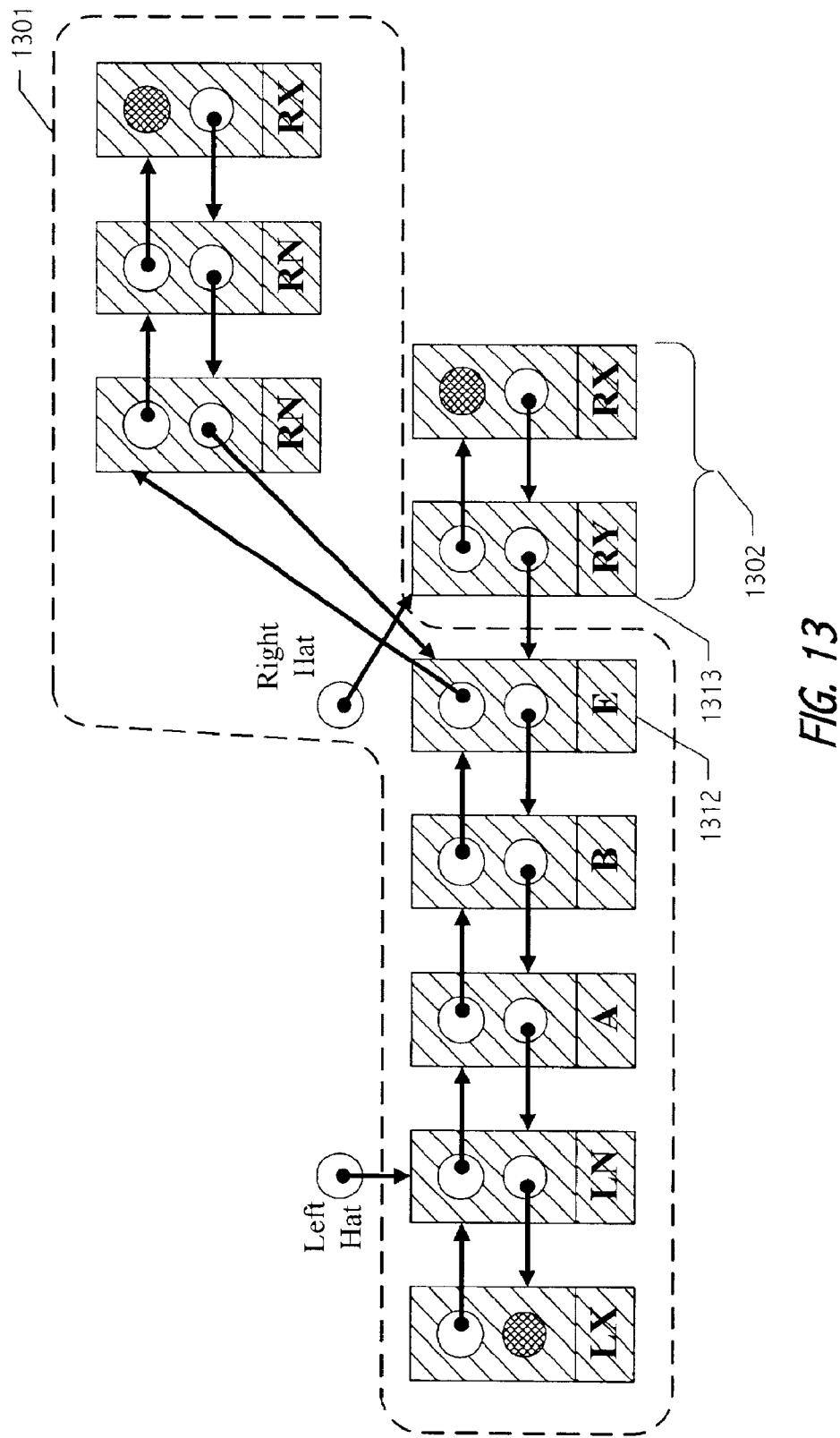
FIG. 13 illustrates a possible spur creation scenario addressed by some embodiments of the present invention.

The implementation of the pushRight access operation further allows processes that are attempting to push values to detect that RHat has gone onto a spur (e.g., as illustrated in FIG. 13) based on failure of the DCAS and presence of a distinguishing value RY in the node identified by the RHat. The pushRight access operation rectifies the problem by invoking unspur_right (at line 11) before retrying the push operation. The unspur_right operation implementation that follows is illustrative.

```
unspur_right( ) {
    rh = RHat;
    if (rh->V == RY) {
        rhL = rh->L;
        ontrack = rhL->R;
        if (ontrack != NULL)
            CAS(&RHat,rh,ontrack);
    }
}
```

Figure 14:
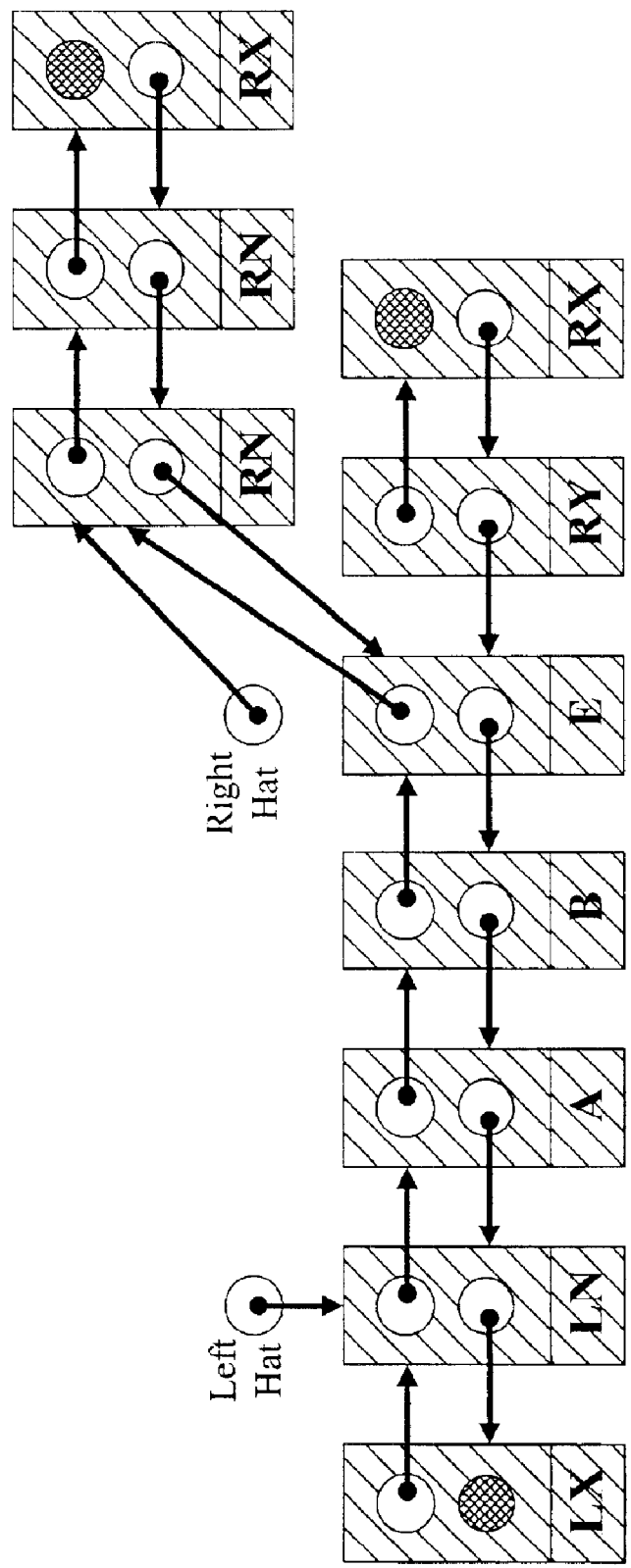
FIG. 14 illustrates a resultant linked-list state after successful completion of an unspur_right operation in accordance with some embodiments of the present invention.

The unspur_right operation verifies that RHat still points to a node labeled with the distinguishing value RY (lines 1–2), follows (line 3) the still-existing pointer from the spur back to the list (e.g., from node 1313 to node 1312, in FIG. 13), determines the correct right-neighbor (line 4), and then uses a CAS primitive to move RHat to the correct node (line 7). FIG. 14 illustrates the result of executing the unspur_right operation from the shared object state shown in FIG. 13. The implementation of unspur_right is simple because nothing except unspurring can happen from a spurred state. In particular, the distinguishing value RY prevents further pushRight operations from completing without first calling unspur_right, and popRight operations naturally move off the spur. Execution of a popLeft operation also poses no problem if it reaches the node where the spur occurred, as it will see the right null value RN in the first node of the newly-added chain, and will correctly conclude that the deque is empty.

The break_cycles_right operation, which is invoked at line 13 of remove_right and described below, is optional (and may be omitted) in implementations for execution environments that provide a facility, such as garbage collection, for automatic reclamation of storage.

Explicit Reclamation of Storage

While the above description has focused on implementations for execution environments that provide intrinsic support for automatic reclamation of storage, or garbage collection, some implementations in accordance with the present invention support explicit reclamation. This is important for several reasons. First, many common programming environments do not support garbage collection. Second, almost all of those that do provide garbage collection introduce excessive levels of synchronization overhead, such as locking and/or stop-the-world collection mechanisms. Accordingly, the scaling of such implementations is questionable. Finally, designs and implementations that depend on existence of a garbage collector cannot be used in the implementation of the garbage collector itself.

It has been discovered that a variation on the above-described techniques may be employed to provide explicit reclamation of nodes as they are severed from the deque as a result of remove operations. The variation builds on a lock-free reference counting technique described in greater detail in U.S. patent application Ser. No. 09/837,671, now pending, entitled "LOCK FREE REFERENCE COUNTING," naming David L. Detlefs, Paul A. Martin, Mark S. Moir, and Guy L. Steele Jr. as inventors, and filed on even date herewith, which is incorporated herein in its entirety by reference.

By applying the lock-free reference counting technique, a deque implementation has been developed that provides explicit reclamation of storage. As before, the deque is represented as a doubly-linked list of nodes, but includes an additional facility that ensures that nodes removed from the list (e.g., by operation of a remove_right_nodes operation) are free of cyclic referencing chains.

As described so far, our deque implementation allows cycles in garbage, because the chains cut off the list by a remove_right_nodes operation are doubly linked. Therefore, in preparation for applying the LFRC methodology, we modified our implementation so that cycles are broken in chains that are cut off from the list. This is achieved (on the right side) by the break_cycles_right operation, which is invoked after successfully performing the DCAS at line 11 of the remove_right operation. The following implementation of a break_cycles_right operation is illustrative.

```
break_cycles_right(p) {
    v = RY;
    q = p->R;
    while (v != RX && q != NULL) {
        do {
            v = q->V;
        } until (CAS(&q->V,v,RY) );
        p->R = NULL;
        p = q;
        q = p->R;
    }
    p->R = NULL;
}
```

The approach employed is straightforward. We simply walk down the referencing chain, setting the forward pointers (e.g., right pointers in the case of break_cycles_right) to null. However, there are some subtleties involved with breaking these cycles. In particular, we need to deal with the possibility of concurrent accesses to the broken off chain while we are breaking it, because some processes may have been accessing it before it was cut off. Concurrent pop and push operations pose no problem. Their DCASs will not succeed when trying to push onto or pop from a cut-off node because the relevant hat (RHat or LHat) no longer points to it. Also, these operations check for null pointers and take appropriate action, so there is no risk that setting the forward pointers to null will cause concurrent push and pop operations to de-reference a null pointer. However, dealing with concurrent remove and add operations is more challenging, as it is possible for both types of operation to modify the chain we are attempting to break it up.

First, simply walking down the list, setting forward pointers to null (presumably using the detection of a null forward pointer as a termination condition), does nothing to prevent another process from adding a new chain onto any node in the chain that contains an terminating RX value. If this happens, the cycles in this newly added chain will never be broken, resulting in a memory leak. Second, a simplistic approach can result in multiple processes concurrently breaking links in the same chain in the case that one process executing remove_right succeeds at line 11 in chopping off some nodes within an already chopped-off chain. This results in unnecessary work and more difficulty in reasoning about correctness.

In the illustrated break_cycles_right implementation, we address both of these problems with one technique. Before setting the forward pointer of a node to null (at line 8), we first use a CAS primitive to set the next node's value field to the distinguishing value RY (lines 5-7). The reason for using a CAS instead of an ordinary store is that we can determine the value overwritten when storing the RY value. If the CAS changes a terminating value RX to an RY value, then the loop terminates (see line 4). It is safe to terminate in this case because either the terminating value RX was in the rightmost node of the chain (and changing the RX to an RY prevents a new chain from being added subsequently), or some process executing a remove_right operation set the value of this node to the terminating value RX (see line 11, remove_right), in which case that process has the responsibility to break the cycles in the remainder of the chain.

Since the break_cycles_right implementation ensures that referencing cycles are broken in chopped node chains, the implementation described is amenable to transformation to a GC-independent form using the lock-free reference counting (LFRC) methodology described in detail in the above-incorporated U.S. Patent Application. However, to summarize, (1) we added a reference count field rc to the node object, (2) we implemented an LFRCDestroy (v) function, (3) we ensured (using the break_cycles_right implementation) that the implementation does not result in referencing cycles in or among garbage objects, (4, 5) we replaced accesses and manipulations of pointer variables with corresponding LFRC pointer operations and (6) we ensured that local pointer variables are initialized to NULL before being used with any of the LFRC operations and are properly destroyed using LFRCDestroy upon return (or when such local pointer variables otherwise go out of scope). LFRC pointer operations employed include LFRCLoad, LFRCStore, LFRCCopy, LFRCPass, LFRCStoreAlloc, LFRCDCAS, LFRCDCAS, LFRCDCAS1 and LFRCDestroy. An illustrative implementation of each is described in detail in the above-incorporated U.S. patent Application.

The illustrative object definitions that follow, including constructor and destructor methods provide the reference counts and ensure proper initialization of a deque and reclamation thereof.

```
class HattrickNode {
    valtype V;
    class HattrickNode *L, *R;
    long rc;
    HattrickNode(valtype v) : L(NULL), R(NULL), V(v), rc(1)
        { };
};
class Hattrick {
    HattrickNode *LeftHat;
    HattrickNode *RightHat;
    Hattrick( ) : LeftHat(NULL), RightHat(NULL) {
        LFRCStoreAlloc(&LeftHat,AllocHattrickNode(LX) );
        LFRCStoreAlloc(&RightHat,AllocHattrickNode(RX) );
        LFRCStoreAlloc(&LeftHat->R,RightHat);
        LFRCStoreAlloc(&RightHat->L,LeftHat);
    };
    ~Hattrick( ) {
        HattrickNode *p = NULL, *q = NULL;
        LFRCLoad(&LeftHat,&p);
```

-continued

```
        while (p) {
            LFRCCopy(&q,p);
            LFRCLoad(&p->L,&p);
        }
        break_cycles_right (LFRCPass(q) );
        LFRCStore(&LeftHat,NULL);
        LFRCStore(&RightHat,NULL);
        LFRCDestroy(p,q);
    }
};
``` wherein the notation LFRCDestroy (p,q) is shorthand for invocation of the LFRCDestroy operation on each of the listed operands.

Corresponding pushRight and popRight access operations follow naturally from the above-described GC-dependent implementations thereof. Initialization of local pointer values, replacement of pointer operations and destruction of local variables as they go out of scope are all straightforward. The following transformed pushRight and popRight access operation implementations are illustrative.

```
pushRight(valtype v) {
    HattrickNode *rh = NULL, *rhR = NULL;
    while (true) {
        LFRCLoad(&RightHat, &rh);
        LFRCLoad(&rh->R,&rhR);
        if (rhR != NULL &&
                LFRCDCAS1(&RightHat,&rh->V,rh,RN,rhR,v) ) {
            LFRCDestroy(rh,rhR);
            return OKval;
        } else if (rh->V == RX) {
            if (!add_right_nodes(some_number) ) {
                LFRCDestroy(rh,rhR);
                return FULLval;
            }
        } else unspur_right( );
    }
}
popRight( ) {
    HattrickNode *rh = NULL, *rhL = NULL;
    valtype result;
    while (true) {
        LFRCLoad(&RightHat,&rh);
        LFRCLoad(&rh->L,&rhL);
        if (rhL!=NULL) {
            result = rhL->V;
            if (result != RN && result != RX &&
                    result != LY && result != RY)
                if (result == LN || result == LX) {
                    if (LFRCDCAS1(&RightHat,&rhL->V,
                            rh,result,rh,result) ) {
                        LFRCDestroy(rh,rhL);
                        return EMPTYval;
                    }
                } else if (LFRCDCAS1(&RightHat,&rhL->V,
                            rh,result,rhL,RN) ) {
                    LFRCDestroy(rh,rhL);
                    return result;
                }
        }
    }
}
```

Corresponding spare node maintenance operations also follow naturally from the above-described implementations thereof. As before, initialization of local pointer values, replacement of pointer operations and destruction of local variables as they go out of scope are all straightforward. The following transformed add_right_nodes and allocate_right_nodes operation implementations are illustrative.

```
add_right_nodes(int n) {
    HattrickNode *newNodeChain = allocate_right_nodes(n);
    HattrickNode *rptr = NULL, *rrptr = NULL;
    valtype v;
    if (newNodeChain == NULL) return false;
    while (true) {
        LFRCLoad(&RightHat,&rptr);
        while (rptr != NULL && (v = rptr->V) == RN)
            LFRCLoad(&rptr->R,&rptr);
        if (v == RY)
            unspur_right( );
        else if (rptr != NULL && v == RX) {
            LFRCStore(&newNodeChain->L,rptr);
            LFRCLoad(&rptr->R,&rrptr);
            if (LFRCDCAS1(&rptr->R,&rptr->V,
                    rrptr,RX,newNodeChain,RN) ) {
                LFRCDestroy(newNodeChain,rptr,rrptr);
                return true;
            }
        }
    }
}
allocate_right_nodes(int n) {
    HattrickNode *last = new HattrickNode(RX),
        *newnode = NULL;
    int i;
    if (last==NULL) return NULL:
    for (i=1; i<n; i++) {
        LFRCCopyAlloc(&newnode, new HattrickNode(RN) );
        if (newnode== NULL) break;
        LFRCStore(&newnode->R,last);
        LFRCStore(&last->L,newnode);
        LFRCCopy(&last,newnode);
    }
    LFRCStore(&last->L,NULL);
    LFRCDestroy(last,newnode);
    return newnode;
}
``` wherein the LFRCDCAS1 pointer operation provides LFRC pointer operation support only for a first addressed location. Because the second addressed location is a literal value, the LFRCDCAS1 operation is employed rather than a LFRCDCAS. The LFRCCopyAlloc pointer operation, like the LFRCStoreAlloc pointer operation described in the above-incorporated U.S. patent Application, is a variant that forgoes certain reference count manipulations for a newly allocated node.

The transformed remove_right_nodes operation implementation that follows is also illustrative.

```
remove_right_nodes(int n) {
    HattrickNode *choppoint = LFRCLoad(&RightHat);
    HattrickNode *rptr = NULL;
    bool rv;
    for (int i=0; i<n; i++) {
        if (choppoint->V==RX) {
            LFRCDestroy(choppoint,rptr);
            return true;
        }
        LFRCLoad(&choppoint->R,&choppoint);
        if (choppoint == NULL) {
            LFRCDestroy(choppoint,rptr);
            return true;
        }
    }
    LFRCLoad(&choppoint->R,&rptr);
    if (rptr == NULL) {
        LFRCDestroy(choppoint,rptr);
        return true;
```

-continued

```
    }
    if (rv = DCAS(&choppoint->V,&rptr->V,RN,RN,RX,RY) ) {
        LFRCCAS(&choppoint->R,rptr,NULL);
        break_cycles_right(LFRCPass(rptr) );
    }
    LFRCDestroy(choppoint,rptr);
    return rv;
}
``` wherein the DCAS primitive at line 22 operates on literals, rather than pointers. Accordingly, replacement with an LFRC pointer operation is not implicated.

Finally, transformed versions of the previously described unspur_right and break_cycles_right operations are as follows:

```
unspur_right ( ) {
    HattrickNode *rh = LFRCLoad(&RightHat);
    HattrickNode *rhL = NULL, *ontrack = NULL;
    if (rh->V == RY) {
        LFRCLoad(&rh->L,&rhL);
        LFRCLoad(&rhL->R,&ontrack);
        if(ontrack != null)
            LFRCCAS(&RightHat,rh,ontrack);
    }
    LFRCDestroy(rh,rhL,ontrack);
}
break_cycles_right(HattrickNode *p) {
    HattrickNode *q = LFRCLoad(&p->R);
    valtype v = RY;
    while (v != RX && q != NULL) {
        do {
            v = q->V;
        } while (!CAS(&q->V,v,RY) );
        LFRCStore(&p->R,NULL);
        LFRCCopy(&p,q);
        LFRCLoad(&p->R,&q);
    }
    LFRCStore(&p->R,NULL);
    LFRCDestroy(p,q);
}
``` where, as before, the CAS primitive at line 20 operates on a literal, rather than a pointer values. Accordingly, replacement with an LFRC pointer operation is not implicated.

While the invention has been described with reference to various embodiments, it will be understood that these embodiments are illustrative and that the scope of the invention is not limited to them. Terms such as always, never, all, none, etc. are used herein to describe sets of consistent states presented by a given computational system. Of course, persons of ordinary skill in the art will recognize that certain transitory states may and do exist in physical implementations even if not presented by the computational system. Accordingly, such terms and invariants will be understood in the context of consistent states presented by a given computational system rather than as a requirement for precisely simultaneous effect of multiple state changes. This "hiding" of internal states is commonly referred to by calling the composite operation "atomic", and by allusion to a prohibition against any process seeing any of the internal states partially performed.

Many variations, modifications, additions, and improvements are possible. For example, while various full-function deque realizations have been described in detail, realizations of other shared object data structures, including realizations that forgo some of access operations, e.g., for use as a FIFO, queue, LIFO, stack or hybrid structure, will also be appreciated by persons of ordinary skill in the art. In addition, more complex shared object structures may be defined that exploit the techniques described herein. Other synchronization primitives may be employed and a variety of distinguishing values may be employed. In general, the particular data structures, synchronization primitives and distinguishing values employed are implementation specific and, based on the description herein, persons of ordinary skill in the art will appreciate suitable selections for a given implementation.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of claims that follow. Structures and functionality presented as discrete components in the exemplary configurations may be implemented as a combined structure or component. These and other variations, modifications, additions, and improvements may fall within the scope of the invention as defined in the claims that follow.

What is claimed is:

1. A double-ended concurrent shared object encoded in at least one computer readable medium and organized as a dynamically sized bidirectional referencing chain of nodes, the double-ended concurrent shared object employing distinguishing values to indicate spare nodes thereof and supporting concurrent non-interfering opposing-end accesses for states of two or more values.

2. The double-ended concurrent shared object of claim 1, wherein the concurrent non-interfering opposing-end accesses include pop-type accesses.

3. The double-ended concurrent shared object of claim 1, wherein the concurrent opposing-end accesses are push- and pop-type accesses, respectively, and wherein the push- and pop-type accesses are non-interfering for states of one or more values.

4. The double-ended concurrent shared object of claim 1, wherein the concurrent opposing-end accesses are push-type accesses, and wherein the push-type accesses are non-interfering for all states.

5. The double-ended concurrent shared object of claim 1, further supporting at least one spare node maintenance operation.

6. The double-ended concurrent shared object of claim 1, wherein the distinguishing values include opposing-end and terminal node variants thereof.

7. The double-ended concurrent shared object of claim 6, wherein the distinguishing values further include opposing-end terminal node variants.

8. The double-ended concurrent shared object of claim 6, wherein the distinguishing values further include at least one dead node marker variant.

9. The double-ended concurrent shared object of claim 1, embodied as a doubly-linked list of nodes allocated from a shared memory of a multiprocessor and access operations executable by processors thereof.

10. The double-ended concurrent shared object of claim 1, embodied as a computer program product encoded in media, the computer program product defining a data structure instantiable in shared memory of a multiprocessor and instructions executable thereby implementing access operations.

11. The double-ended concurrent shared object of claim 10,
wherein the data structure includes a double-ended queue; and
wherein the access operations include opposing-end variants of push and pop operations.

12. The double-ended concurrent shared object of claim 1, embodied as a doubly-linked list of nodes allocated from a memory of a processor and access operations executable thereby.

13. The double-ended concurrent shared object of claim 1, embodied as a computer program product encoded in media, the computer program product defining a data structure instantiable in memory of a processor and instructions executable thereby implementing access operations.

14. The double-ended concurrent shared object of claim 1, wherein each of the nodes that are severed from the referencing chain are explicitly reclaimed by a respective process that destroys a last pointer thereto.

15. The double-ended concurrent shared object of claim 1, wherein those of the nodes that are severed from the referencing chain are reclaimed by an automatic storage reclamation facility of an execution environment.

16. A method of facilitating concurrent programing using a dynamically-sized, linked-list representation of a double ended queue (deque), the method comprising:

encoding the deque in at least one computer readable medium using a subset of nodes of the linked-list, the linked-list including spare nodes at either or both ends of the deque;

defining opposing-end variants of push and pop access operations on the deque; and defining opposing-end variants of at least one spare node maintenance operation, wherein execution of any of the access and spare node maintenance operations is linearizable and non-blocking with respect to any other execution of the access and spare node maintenance operations.

17. The method of claim 16, further comprising:

employing left and right sentinel nodes of the linked-list to delimit the deque, wherein the left and right sentinel nodes and any spare nodes beyond a respective sentinel node encode a distinguishing value in a value field thereof.

18. The method of claim 17, further comprising:

employing opposing-end and terminal node variants of the distinguishing value.

19. The method of claim 18, further comprising:

employing opposing-end terminal node variants of the distinguishing value.

20. The method of claim 18, further comprising:

employing at least one dead node marker variant of the distinguishing value.

21. The method of claim 16, wherein each of the access operations includes a synchronization operation targeting both a respective sentinel node and a value of a corresponding node, thereby ensuring linearizable and non-blocking execution with respect to any other execution of an access operation.

22. The method of claim 21, wherein for at least some of the access operations, the synchronization operation is a Double Compare And Swap (DCAS) operation.

23. The method of claim 21, wherein for at least some of the access operations, the synchronization operation is an N-way Compare And Swap (NCAS) operation.

24. The method of claim 21, wherein for at least some of the access operations, the synchronization operation employs transactional memory.

25. The method of claim 16, wherein each of the spare node maintenance operations includes a synchronization operation targeting both a respective target node and a value of a corresponding node, thereby ensuring linearizable and non-blocking execution with respect to any other execution of an access or spare node maintenance operation.

26. The method of claim 16, wherein each of the pop access operations includes a single synchronization operation per uncontended execution path thereof.

27. The method of claim 16, wherein, if a suitable spare node is available, each of the push access operations includes a single synchronization operation per uncontended execution path thereof.

28. The method of claim 16, wherein overhead associated with execution of each of the spare node maintenance operations is amortizable over multiple executions of the access operations that target a particular maintained node.

29. The method of claim 16, wherein the at least one spare node maintenance operation is an add-type maintenance operation and includes a single synchronization operation per uncontended execution path thereof.

30. The method of claim 29, wherein the at least one spare node maintenance operation further includes a remove-type maintenance operation that employs a dead node distinguishing value encoding to facilitate at least detection of a spur condition.

31. The method of claim 16, wherein the at least one spare node maintenance operation includes opposing-end variants of both add-type and remove-type operations.

32. A concurrent double ended queue representation encoded in one or more computer readable media, the deque representation comprising:

a doubly-linked list of nodes, including an interior subset thereof encoding the deque, left and right sentinel ones immediately adjacent to the interior subset, and one or more spare nodes beyond each of the left and right sentinel nodes;

push and pop access operations executable to access each of opposing ends of the deque; and spare node maintenance operations executable to control numbers of the spare nodes beyond the left and right sentinel nodes, wherein execution of any of the access and spare node maintenance operations is linearizable and non-blocking with respect to any other execution of the access and spare node maintenance operations.

33. The deque representation of claim 32, further comprising:

separate left sentinel and right sentinel identifier storage; and separate value storage associated with each of the nodes of the list, wherein a distinguishing value encoded therein is distinguishable from a literal or pointer value, wherein each of the access operations employs a synchronization operation to ensure linearizable modification of corresponding sentinel identifier storage and value storage, despite concurrent execution of conflicting ones of the access operations.

34. The deque representation of claim 33, wherein the distinguishing value includes three variants thereof, respectively indicative of:

a terminal node;

a non-terminal left spare or sentinel node; and a non-terminal right spare or sentinel node.

35. The deque representation of claim 33, wherein the distinguishing value includes four variants thereof, respectively indicative of:
- a left terminal node;
- a right terminal node;
- a non-terminal left spare or sentinel node; and
- a non-terminal right spare or sentinel node.

36. The deque representation of claim 33, wherein the distinguishing value includes at least five variants thereof, respectively indicative of:
- a left terminal node;
- a right terminal node;
- a dead node;
- a non-terminal left spare or sentinel node; and
- a non-terminal right spare or sentinel node.

37. The deque representation of claim 33, wherein the synchronization operation employed by each one of the access operations is selected from the set of:
- a Double Compare And Swap (DCAS) operation; and
- an N-way Compare And Swap (NCAS) operation.

38. The deque representation of claim 33, wherein the synchronization operation employed by each one of the access operations employs transactional memory.

39. The deque representation of claim 33,
wherein the synchronization operation employed by each one of the access operations is not necessarily the same.

40. The deque representation of claim 33,
wherein the spare node maintenance operations include a remove-type spare node operation operable at a chop point; and
wherein left and right variants of the distinguishing value are themselves distinguishable.

41. The deque representation of claim 33,
wherein the spare node maintenance operations operate on the list at respective target nodes; and
wherein each of the spare node maintenance operations includes a synchronization operation to ensure linearizable modification of a pointer to the respective target node and corresponding value storage, despite concurrent execution of conflicting ones of the access and spare node maintenance operations.

42. The deque representation of claim 32,
wherein the spare node maintenance operations include add-type spare node operations.

43. The deque representation of claim 32,
wherein the spare node maintenance operations include both add-type and remove-type spare node operations.

44. The deque representation of claim 32,
wherein at least the nodes are allocated from a garbage-collected memory space.

45. A method of managing access to elements of a sequence encoded in a linked-list susceptible to concurrent accesses to one or both ends of the sequence, the method comprising:
- encoding the sequence in at least one computer readable medium using a subset of nodes of the linked-list, the linked-list including spare nodes at at least one end of the subset of sequence encoding nodes;
- mediating the concurrent accesses using a linearizable synchronization operation operable on an end-of-sequence identifier and a corresponding node value, wherein node values distinguish between sequence encoding nodes and spare nodes; and
- in response to a depletion of the spare nodes, adding one or more additional nodes to the linked-list.

46. The method of claim 45, further comprising:
- in response to an excess of the spare nodes, removing one or more of the spare nodes from the linked-list.

47. The method of claim 45,
wherein the node values further distinguish between terminal nodes and spare nodes.

48. The method of claim 45,
wherein the sequence is susceptible to access at both ends thereof, and
wherein the node values further distinguish spare nodes at one end from those at the other.

49. The method of claim 45,
wherein the sequence encoding nodes represent a double ended queue (deque);
wherein the concurrent accesses include add and remove operations at each end of the deque; and
wherein the adding of one or more additional nodes is performed at each end of the deque in response to a depletion of the spare nodes at that respective end of the deque.

50. The method of claim 45,
wherein the sequence encoding nodes represent a stack;
wherein the concurrent accesses include add and remove operations at a top-end of the stack; and
wherein the adding of one or more additional nodes is performed at the top-end in response to a depletion of the spare nodes at the top-end.

51. The method of claim 45,
wherein the sequence encoding nodes represent a queue;
wherein the concurrent accesses include add and remove operations at respective ends of the queue.

52. The method of claim 45, wherein the concurrent accesses include less than all of:
- a first-end add operation;
- a first-end remove operation;
- a second-end add operation; and
- a second-end remove operation.

53. The method of claim 45,
wherein a subset of the concurrent accesses are performed only by a single process or processor.

54. The method of claim 45,
wherein at least some instances of the linearizable synchronization operation include a double compare and swap (DCAS) operation.

55. The method of claim 45,
wherein at least some instances of the linearizable synchronization operation employ transactional memory.

56. A concurrent shared object representation encoded in one or more computer readable media, the concurrent shared object representation comprising:
- a doubly-linked list of nodes, each having a left pointer, a right pointer and a value;
- a pair of shared variables that identify respective left and right sentinel ones of the nodes, each encoding a distinguishing value;
- a sequence of zero or more values encoded using respective ones, zero or more, of the nodes linked between the left and right sentinel nodes in the list;
- spare ones of the nodes beyond either or both of the left and right sentinel nodes in the list;
- access operations defined for access to opposing ends of the sequence; and
- spare node maintenance operations defined to add additional spare nodes to and remove excess spare nodes from the list, wherein concurrent operation of competing ones of the access and spare node maintenance operations is mediated by linearizable synchronization operations.

57. A computer program product encoded in at least one computer readable medium, the computer program product comprising:

functional sequences implementing left- and right-end access operations and at least one spare node maintenance operation on a double-ended concurrent shared object instantiable as a doubly-linked list of nodes, including an interior subset thereof encoding a double-ended sequence, left and right sentinel nodes immediately adjacent the interior subset, and one or more spare nodes beyond each of the left and right sentinel nodes, wherein instances of the functional sequences are concurrently executable by plural execution units and each include a linearizable synchronization operation to mediate competing executions of the functional sequences.

58. The computer program product of claim 57, wherein the spare node maintenance operations include:

both add- and remove-type operations.

59. The computer program product of claim 57, wherein the access operations include:

the left- and right-end remove-type operations; and at least one insert-type operation.

60. The computer program product of claim 57, wherein the access operations include:

the left- and right-end insert-type operations; and at least one remove-type operation.

61. The computer program product of claim 57, wherein the access operations include left- and right-end push and pop operations.

62. The computer program product of 57, wherein the at least one computer readable medium is selected from the set of a disk, tape or other magnetic, optical, or electronic storage medium and a network, wireline, wireless or other communications medium.

63. An apparatus comprising:

plural processors;

one or more stores addressable by the plural processors;

left and right identifiers accessible to each of the plural processors for identifying a double-ended sequence represented by an interior subset of nodes of a doubly-linked list encoded in the one or more stores, the doubly-linked list including left and right sentinel nodes immediately adjacent the interior subset and one or more spare nodes beyond each of the left and right sentinel nodes; and means for coordinating competing left- and right-end access operations and at least one spare node maintenance operation on the list, the coordinating means employing instances of a linearizable synchronization operation and distinguishing node value encodings.

64. The apparatus of claim 63, means for explicitly reclaiming a node severed from the list.

* * * * *

UNITED STATES PATENT AND TRADEMARK OFFICE
CERTIFICATE OF CORRECTION

PATENT NO. : 7,017,160 B2
APPLICATION NO. : 09/837669
DATED : March 21, 2006
INVENTOR(S) : Martin et al.

It is certified that error appears in the above-identified patent and that said Letters Patent is hereby corrected as shown below:

"Other Publications" section, page 2, column 2, 8$^{th}$ listed reference, delete "M.P. Herlighy" and replace with --M.P. Herlihy--;

Column 1, line 11, delete "abandoned" and replace with --pending--;

Column 1, line 48, delete "lock-released" and replace with --lock released--;

Column 2, line 25, delete "AU" and replace with --All--;

Column 7, line 23, delete "*addr2 = new2:" and replace with --*addr2 = new2;--;

Column 8, line 2, delete "fill" and replace with --full--;

Column 8, line 21, delete "fill" and replace with --full--;

Column 8, line 46, delete "pop_right (changes" and replace with --pop_right ( ) changes--;

Column 12, line 61, delete "right When" and replace with --right. When--;

Column 13, line 57, delete "deque," and replace with --deque.--;

Column 15, line 12, delete "Node allocate_right_nodes9int howMany) {" and replace with --Node allocate_right_nodes (int howMany) {--;

Column 15, line 20, delete "lastNode = newNode" and replace with --lastNode = newNode;--;

Column 17, line 4, delete "RaN" and replace with --RN--;

Column 17, line 11, delete "possibly" and replace with --(possibly--;

Column 17, line 14, delete "retying" and replace with --retrying--;

UNITED STATES PATENT AND TRADEMARK OFFICE
CERTIFICATE OF CORRECTION

PATENT NO. : 7,017,160 B2
APPLICATION NO. : 09/837669
DATED : March 21, 2006
INVENTOR(S) : Martin et al.

It is certified that error appears in the above-identified patent and that said Letters Patent is hereby corrected as shown below:

Column 20, line 47, delete "if (v = DCAS(&chop-V,&rptr->V,RN,RN,RX,RY)) {" and replace with --if (v = DCAS(&chop->V,&rptr->V,RN,RN,RX,RY)) {--;

Column 24, line 63, delete "LFRCStoreAlloc(&LeftHat->R,RightHat);" and replace with --LFRCStore(&LeftHat->R,RightHat);--;

Column 24, line 64, delete "LFRCStoreAlloc(&RightHat->L,LeftHat);" and replace with --LFRCStore(&RightHat->L,LeftHat);--;

Column 30, claim 32, line 1, add --(deque)-- after "queue".

Signed and Sealed this

Twelfth Day of August, 2008

JON W. DUDAS
*Director of the United States Patent and Trademark Office*